(12) United States Patent
Kohashi et al.

(10) Patent No.: US 7,038,737 B1
(45) Date of Patent: May 2, 2006

(54) IMAGE PROCESSING DEVICE

(75) Inventors: Yasuo Kohashi, Fukuoka (JP);
Toshihiro Moriiwa, Fukuoka (JP);
Masayoshi Tojima, Fukuoka (JP);
Shunichi Kuromaru, Fukuoka (JP);
Masahiro Oohashi, Fukuoka (JP)

(73) Assignee: Matsushita Electric Industrial Co., Ltd., (JP)

( * ) Notice: Subject to any disclaimer, the term of this patent is extended or adjusted under 35 U.S.C. 154(b) by 0 days.

(21) Appl. No.: 09/856,634

(22) PCT Filed: Nov. 25, 1999

(86) PCT No.: PCT/JP99/06590

§ 371 (c)(1),
(2), (4) Date: Jun. 29, 2001

(87) PCT Pub. No.: WO00/31647

PCT Pub. Date: Jun. 2, 2000

(30) Foreign Application Priority Data

Nov. 26, 1998 (JP) ................................. 10-335442
Nov. 27, 1998 (JP) ................................. 10-338082

(51) Int. Cl.
*G06F 13/28* (2006.01)

(52) U.S. Cl. .................................................... 348/718
(58) Field of Classification Search ........ 348/718–721, 348/714; 370/263; 345/534
See application file for complete search history.

(56) References Cited

U.S. PATENT DOCUMENTS

| 4,181,933 | A |   | 1/1980 | Benysek ..................... 364/200 |
| 5,444,497 | A | * | 8/1995 | Takeuchi .................... 348/719 |
| 5,585,864 | A | * | 12/1996 | Takeuchi .................... 348/719 |
| 5,594,702 | A | * | 1/1997 | Wakeman et al. ..... 365/230.05 |
| 5,668,811 | A |   | 9/1997 | Worsley et al. ............. 370/424 |
| 5,768,628 | A | * | 6/1998 | Priem .......................... 710/62 |
| 5,940,189 | A |   | 8/1999 | Matsubara et al. |
| 5,943,504 | A | * | 8/1999 | Flurry et al. .................. 710/22 |
| 6,584,077 | B1 | * | 6/2003 | Polomski .................... 370/263 |
| 6,647,486 | B1 | * | 11/2003 | Ohba .......................... 712/23 |

FOREIGN PATENT DOCUMENTS

| EP | 0 732 659 | 9/1996 |
| GB | 2 264 022 | 8/1993 |
| JP | 1-193959 | 8/1989 |
| JP | 4-276845 | 10/1992 |
| JP | 5-158864 | 6/1993 |
| JP | 5-204831 | 8/1993 |
| JP | 6-22145 | 1/1994 |
| JP | 6-110825 | 4/1994 |
| JP | 07306825 | 11/1995 |

(Continued)

*Primary Examiner*—Paulos M. Natnael
(74) *Attorney, Agent, or Firm*—Steptoe & Johnson LLP

(57) ABSTRACT

The image processing apparatus according to the present invention comprises: DMA control means 112 having image input/output processing means 100, an external memory 111, DMA setting holding means 113, address generating means 114, DRAM control means 115, DMA request generating means 119, and DMA request adjusting means 120; a processor 116 including encoding/decoding processing means 117; and a DMA bus 118 as shown in FIG. 1.

In the image processing apparatus so constructed, a transfer data group which can be previously subjected to DMA scheduling is divided into burst transfer units, and the DMA request generating means periodically issues the DMA request in the burst transfer units and performs DMA of the transfer data which cannot be subjected to the DMA scheduling during the period that the DMA of the transfer data is not performed, thereby avoiding concentration of specific DMA.

11 Claims, 8 Drawing Sheets

FOREIGN PATENT DOCUMENTS

| | | |
|---|---|---|
| JP | 8-36542 | 2/1996 |
| JP | 8-137780 | 5/1996 |
| JP | 8-249269 | 9/1996 |
| JP | 8-314793 | 11/1996 |
| JP | 9-91247 | 4/1997 |
| JP | 9-223102 | 8/1997 |
| JP | 10-40213 | 2/1998 |
| JP | 11-143812 | 5/1999 |

* cited by examiner

IMAGE PROCESSING DEVICE

TECHNICAL FIELD

The present invention relates to an image processing apparatus having a data transfer control apparatus, which can improve the data transfer efficiency of a memory which shares different types of data by a time division method.

BACKGROUND ART

In recent years, systems utilizing image communication such as a visual telephone and a television conference system has been becoming of great interest. Typically, a communication line utilized in this system has a low transmission speed. Therefore, an image encoding/decoding technique is essential for the transmission of image data of massive data amount, and actually, various kinds of encoding/decoding methods have been devised.

Further, in these circumstances, it has been desired to provide an image processing apparatus which performs image encoding/decoding processing by a processor which can be controlled by programs, and which can flexibly correspond to various encoding/decoding methods by replacement of a control program.

Further, in video compression and decompression processings in the conventional image processing apparatus, complicated data transfer, such as obtaining image data of a part of a region, has been required. Such complicated data transfer is realized on the basis of a large amount of control information. Therefore, there is a problem that, after the control information is obtained after the data transfer which is presently being executed is completed, the next data transfer is executed, the larger the number of control information is, the longer the time interval between the completion of the data transfer and the start of the next data transfer is, thereby resulting in a deteriorated data transfer efficiency.

In order to solve this problem, in the conventional image processing apparatus, there is provided a data transfer control apparatus in which there are provided data transfer control information obtaining means and reservation data transfer information holding means, the control information required for the next data transfer is acquired while the data transfer is being executed to be stored in the reservation data transfer information holding means, and when the data transfer now being executed is completed, the next data transfer can be immediately started on the basis of the control data prepared in the reservation data transfer information holding means.

An example of an image processing apparatus X which is conventionally used as described above and performs encoding/decoding processing by a processor which can be controlled by programs will be described with reference to FIG. 8.

FIG. 8 is a structural block diagram illustrating the image processing apparatus X. The image processing apparatus X includes image input/output processing means 500, input control means 501 for performing resolution conversion of the input image and image noise removal processing using the input image and the previous frame image, an input image buffer 502 which temporarily holds the output image data of the input control means 501 before transferring the data from the input control means 501 to an external memory 511, a previous frame image buffer 503 which temporarily holds the previous frame image data stored in the external memory 511 before giving the same to the input control means 501, a sub-picture generation input buffer 504 which temporarily holds the display image data stored in the external memory 511 before giving the same to sub-picture generating means 505, sub-picture generating means 505 for performing resolution conversion of the display image data stored in the external memory 511 into the sub-picture, a sub-picture generation output buffer 506 which temporarily holds sub-picture image data which is generated by the sub-picture generating means 505, before transferring the data from the sub-picture generating means 505 to the external memory 511, a sub-picture buffer 507 which temporarily holds the sub-picture image data stored in the external memory 511, before giving the same to display control means 510, a main picture buffer 508 which temporarily holds the display image data which is stored in the external memory 511, before giving the same to the display control means 510, a graphics buffer 509 which temporarily holds graphics data stored in the external memory 511, before giving the same to the display control means 510, an external memory 511 which stores data, with performing region segmentation for different types of image data, such as encoding target image, a sub-picture, a display image, and graphics, DMA control means 512 for controlling a data transfer between the image input/output processing means 500 or the processor means 516 and the external memory 511, i.e., a Direct Memory Access (hereinafter, referred to as "DMA"), DMA settings holding means 513 for holding respective setting information for performing the DMA control, address generating means 514 for generating an address of the external memory 511 in accordance with the DMA setting information, DRAM control means 515 for controlling writing and reading of the external memory 511, the processor means 516 which can be controlled by programs, encoding/decoding processing means 517 for processing an image of the external memory 511 or code data by program control, and a DMA bus 518 which performs DMA between the input image buffer 502, the previous frame image buffer 503, the sub-picture generation input buffer 504, the sub-picture generation output buffer 506, the sub-picture buffer 507, the main picture buffer 508, and the graphics buffer 509, the processor means 516, and the external memory 511.

Hereinafter, the operation of the image processing apparatus X so constructed will be briefly described.

Initially, an input image is always input to the input control means 501 with synchronized with a video synchronizing signal at a constant rate.

After the input image is input to the input control means 501, the input control means 501 performs resolution conversion of the input image into the image size to be encoded. Thereafter, the input control means 501 temporarily stores the same in the input image buffer 502.

In addition, the input control means 501 performs removal processing of noises in the input image by using the previous frame image. In this case, the previous frame image stored in the external memory 511 is subjected to the DMA to the previous image buffer 503, and noise removal processing is performed while reading the previous frame image from the previous frame image buffer 503.

When the display image stored in the external memory 511 is displayed as the sub-picture, the sub-picture generating means 505 performs resolution conversion of the display image transferred from the external memory 511 through the sub-picture generation input buffer 504 into the sub-picture size, and temporarily stores the same in the sub-picture generation output buffer 506. Thereafter, the stored display image is transferred from the sub-picture generation output buffer 506 to the external memory 511.

The display control means 510 reads the sub-picture, the main picture, and the graphics data from the sub-picture buffer 507, the main picture buffer 508, and the graphics buffer 509, respectively, and, after display composition, synchronizes the same with the video synchronizing signal as the display image to output at a constant rate.

The processor means 516 transfers image data of an encoding target, which is stored in the external memory 511, to the inside of the processor, performs encoding processing, and transfers the code data to the external memory 511. Further, the processor means 516 transfers the code data stored in the external memory 511 to the inside of the processor, performs decoding processing, and transfers the same to the external memory 511 as the display image data.

The DMA among the external memory 511, the input image buffer 502, the previous frame image buffer 503, the sub-picture generation input buffer 504, the sub-picture generation output buffer 506, the sub-picture buffer 507, the main picture buffer 508, and the graphics buffer 509, and the processor means 516 is executed by the processor means 516 making DMA request to the DMA control means 512.

When the DMA request is made by the processor means 516, the DMA control means 512 gives the DMA settings information which is set in DMA setting holding means 513 to the address generation means 514.

The address generating means 514 generates an access address of the external memory 511 on the basis of the received DMA setting information, and gives the same to the DRAM control means 515.

The DRAM control means 515 controls reading or writing of either of the input image buffer 502, the previous frame image buffer 503, the sub-picture generation input buffer 504, the sub-picture generation output buffer 506, the sub-picture buffer 507, the main picture buffer 508, and the graphics buffer 509, or the processor means 516, and writing or reading of the external memory 511.

The external memory 511, the input image buffer 502, the previous frame image buffer 503, the sub-picture generation input buffer 504, the sub-picture generation output buffer 506, the sub-picture buffer 507, the main picture buffer 508, the graphics buffer 509, and the processor buffer 516 are connected by a single DMA bus, and the DMA with the external memory 511 is performed by the time division method.

However, in a structure of the conventional image processing apparatus X as described above, all the DMA scheduling with the external memory 511 is performed by the processor means 516. Therefore, there has been a problem that the publication timing of the DMA request sometimes becomes irregular in accordance with a processing load of the processor means 516.

On the other hand, image input/output of image input/output processing means 500 must be synchronized with the video synchronizing signal and be input and output at the constant rate. Therefore, in order to absorb the irregularity of the DMA, the memory capacity of each buffer is increased, and the measures such as the speed-up of the transfer speed due to the extension of the DMA bus width and the raise of an operating frequency are taken. However, here, there has been a problem such as the increase in the circuit scale and the complication of the circuit design.

Further, in a data transfer control apparatus used in the conventional image processing apparatus, after completing the data transfer which is being executed, the next data transfer is executed. Therefore, there has been a problem, for example, that a transfer execution start of urgently required data is delayed, and therefore, data cannot be obtained within the required time.

The present invention is made to solve these problems, and has its object to provide an image processing apparatus which enables the data transfer control in which the DMA is preformed while sharing a single memory by comprising the data transfer control apparatus which can start data transfer with high priority without waiting for the completion of the data transfer which is being executed, and more particularly, an image processing apparatus which enables the data transfer control which realizes the efficient DMA by preventing a specific DMA from being concentratively generated as well as suppressing the increase in the circuit scale.

DISCLOSURE OF THE INVENTION

In an image processing apparatus of claim 1 of the present invention comprising: image input/output processing means for inputting/outputting an image; a memory which shares different types of image data by time division; encoding/decoding processing means for encoding or decoding data stored in the memory; and data transfer control means for controlling a data transfer from the memory to the image input/output processing means or the encoding/decoding processing means, a transfer data group which can be subjected to direct memory access scheduling is divided into burst transfer units, the direct memory access in the burst transfer units is periodically performed, and the transfer data which cannot be subjected to direct memory access scheduling is subjected to the direct memory access during the period that the transfer data is not subjected to the direct memory access.

According to an image processing apparatus of claim 2 of the present invention, in the image processing apparatus of claim 1, the burst transfer unit is obtained by combining a block unit into which the transfer data which can be previously subjected to the direct memory access scheduling is equally divided, and the block unit is periodically subjected to the direct memory access.

In an image processing apparatus of claim 3 of the present invention comprising: image input/output processing means for inputting/outputting an image; a memory which shares different types of image data by a time division method; and data transfer control means for controlling a data transfer from the memory to the image input/output processing means or the encoding/decoding processing means, the data transfer control means comprises: encoding/decoding processing means for encoding or decoding data stored in the memory; direct memory access request generating means for generating a transfer timing of data which can be previously subjected to the direct memory access scheduling; direct memory access request adjusting means for performing adjustment so as to interrupt the direct memory access with the encoding/decoding processing means and preferentially execute the direct memory access of the image input/output processing means in the case where the direct memory access request is made from the direct memory access request generating means; direct memory access settings holding means for holding setting information of the direct memory access; data transfer executing means for generating an address of the memory on the basis of direct memory access setting information to transfer data by an instruction from the direct memory access request adjusting means; and memory control means for controlling writing or read-out of the memory.

According to an image processing apparatus of claim 4 of the present invention, in the image processing apparatus of claim 3, the direct memory access request generating means comprises: frame detecting means for detecting the head of the frame; first line detecting means for detecting the head of the line inside the frame; clock counting means for receiving a line head signal from the first line detecting means to reset a discrete value, and thereafter counting an operation clock; line counting means for receiving a frame head signal from the frame detecting means to reset a discrete value, and thereafter counting a line head signal from the first line detecting means; second line detecting means for detecting a start time of the direct memory access in burst transfer units which can be previously subjected to the direct memory access scheduling from the discrete value of the clock counting means; line cycle counting means for resetting the discrete value by the frame head signal from the frame detection means and a signal after one cycle end and counting the line detecting signal from the second line detecting means; efficient vertical period detecting means for detecting an efficient line period from the discrete value of the line counting means and a detecting signal of the second line detecting signal; efficient line detecting means for detecting an efficient line from the discrete value of the line cycle counting means; and request signal detecting means for detecting a request timing of the direct memory access from the discrete value of the clock counting means, and generates a direct memory access request signal from a signal output of the efficient vertical period detecting means, a signal output of the efficient line detecting means, and a signal output of the request signal detecting means.

As described above, according to the image processing apparatus of claims 1 through 4 of the present invention, DMA control means comprises: DMA request generating means for generating a transfer timing of data which can be previously subjected to DMA scheduling; and DMA request adjusting means for performing adjustment so as to interrupt the DMA of the processor means and preferentially execute the DMA with the image input/output processing means in the case where the DMA request is made from the DMA request generating means. A transfer data group which can be previously subjected to DMA scheduling is divided into burst transfer units. The DMA request generating means periodically issues the DMA request in the burst transfer units and performs DMA of the transfer data which cannot be scheduled during the period that the DMA of the transfer data is not performed, thereby avoiding concentration of specific DMA and regularizing the DMA. Such a data transfer control method can be realized so that a reduction in each buffer capacity and the high efficiency of the data transfer become possible.

According to an image processing apparatus of claim 5 of the present invention, in the image processing apparatus of claim 3, the direct memory access settings holding means comprises: first control information storage means for storing control information required for data transfer control performed by the data transfer control means; second control information storage means for holding control information required for the data transfer control concerning the direct memory access to be preferentially executed; third control information storage means for, when the data transfer by the data transfer executing means is interrupted, saving the control information required for retransferring the data later to store; and control information transfer means for performing a transfer of the control information among the first through third control information storage means, and a transfer of the control information between the data transfer executing means, and the second control information storage means and the third control information storage means.

According to an image processing apparatus of claim 6 of the present invention, in the image processing apparatus of claim 3, the direct memory access adjusting unit comprises; data transfer request adjusting means for receiving a data transfer request from the encoding/decoding means or the direct memory access request generating means and selecting a classification of the data transfer to be executed next and a priority of the data transfer; second data transfer classification holding means for holding a classification of the data transfer corresponding to the control information held by the second control information storage means; second data transfer priority holding means for holding priority information corresponding to the control information held by the second control information storage means; first data transfer classification holding means for holding a classification of the data transfer which is being executed in the data transfer executing means; first data transfer priority holding means for holding priority information of the data transfer which is being executed in the data transfer executing means; third data transfer classification holding means for holding a classification of the data transfer corresponding to the control information held by the third control information storage means; third data transfer priority holding means for holding priority information of the data transfer corresponding to the control information held by the third control information storage means; and control information save means for executing data transfer control by using information of a reservation end flag which shows completing an obtainment of the control information by either of the data transfer request adjusting means, the first through third data transfer classification holding means, the first through third data transfer priority holding means, and the second control information holding means, and information of a save end flag which shows completing the storage of the control information held by the third control information storage means in the first control information storage means.

According to an image processing apparatus of claim 7 of the present invention, in the image processing apparatus of claim 6, the data transfer request adjusting means selects a data transfer request which has the highest data transfer priority as well as is received earliest among the ones from which classifications of the data transfer held by the first through third data transfer classification holding means are excluded of the received data transfer requests, as the data transfer to be executed next.

According to an image processing apparatus of claim 8 of the present invention, in the image processing apparatus of claim 7, the data transfer request adjusting means comprises: priority information registering means for registering priority information of the received data transfer request; new data transfer request detecting means for detecting classifications of the data transfer request newly registered in the priority information registering means; data transfer request order registering means for registering classifications of the data transfer request detected by the new data transfer request detecting means in order; and top priority proposed data transfer detecting means for detecting a classification of the data transfer request which has the highest data transfer priority as well as is received earliest among the ones from which classifications of the data transfer held by the first through third data transfer classification holding means are excluded, from information registered by the priority information registering means and the data transfer request order registering means, and information held by the first through third data transfer classification holding means.

According to an image processing apparatus of claim 9 of the present invention, in the image processing apparatus of claim 8, the data transfer request adjusting means changes priority information registered by the priority information registering means in accordance with the result detected by the top priority proposed data transfer detecting means.

As described above, according to the image processing apparatus of claims 5 through 9 of the present invention, there are provided the data transfer executing means for executing the data transfer, and the control means for receiving the data transfer request having priority information to select the data transfer to be executed next and, in the case where the priority of the selected data transfer is higher than the priority of the data transfer which is being executed in the data transfer executing means, interrupting the execution of the data transfer executing means to start the next data transfer. Therefore, even when the data transfer is immediately required, if the data transfer request having higher priority than the data transfer which is being presently executed is made, the data transfer which is being presently executed is temporarily interrupted, and high priority data transfer can be executed without waiting for the completion of the data transfer which is being presently executed. Therefore, the data transfer can be certainly completed within the required period.

In addition, as for the interrupted data transfer, the control information required for the transfer resumption of this data is saved and stored. Therefore, as soon as the data transfer request with higher priority than the interrupted data transfer is lost, the interrupted data transfer can restart, thereby preventing the data transfer efficiency as a whole from lowering.

Further, the data transfer priority can be freely set at the time of the data transfer request by the data transfer request adjusting means included in the control means. Therefore, efficient data transfer control becomes possible, and a great effect can be shown especially in the case where the data transfer amount and processing priority are diverse, and many data transfer classifications coexist.

BEST MODE FOR CARRYING OUT THE INVENTION

Hereinafter, embodiments of the present invention will be described with reference to FIGS. 1 through 8. The embodiments which are shown herein are merely examples and the present invention is not limited to these embodiments.

Embodiment 1

Hereinafter, an image processing apparatus A according to the present invention, which can apply a data transfer control method for realizing an efficient DMA, will be described as a first embodiment with reference to the drawings.

Figure 1:
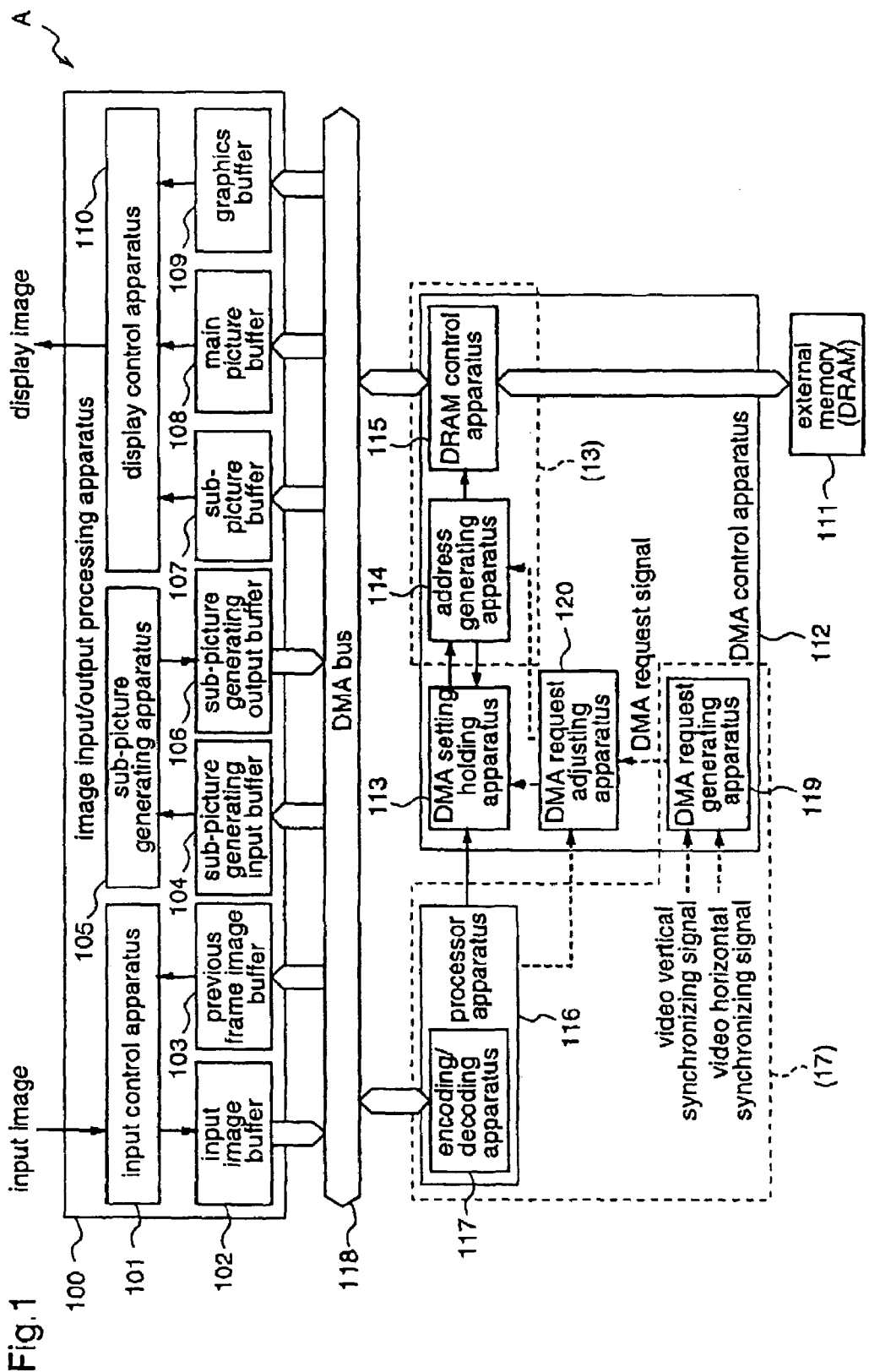
FIG. 1 is a structural block diagram of an image processing apparatus according to a first embodiment of the present invention.

FIG. 1 is a structural block diagram of the image processing apparatus A.

This image processing apparatus A comprises image input/output processing means 100, input control means 101 for performing resolution conversion of the input image and image noise removal processing using the input image and the previous frame image, an input image buffer 102 which temporarily holds the output image data of the input control means 101 before transferring the data from the input control means 101 to an external memory 111, a previous frame image buffer 103 which temporarily holds the previous frame image data stored in the external memory 111 before giving the same to the input control means 101, a sub-picture generation input buffer 104 which temporarily holds the display image data stored in the external memory 111 before giving the same to sub-picture generating means 105, sub-picture generating means 105 for performing resolution conversion of the display image data stored in the external memory 111 into that of the sub-picture, a sub-picture generation output buffer 106 which temporarily holds sub-picture image data which generated by the sub-picture generating means 105, before transferring data from the sub-picture generation means 105 to the external memory 111, a sub-picture buffer 107 which temporarily holds the sub-picture image data stored in the external memory 111, before giving the same to display control means 110, a main picture buffer 108 which temporarily holds the display image data which is stored in the external memory 111, before giving the same to the display control means 110, a graphics buffer 109 which temporarily holds graphics data stored in the external memory 111, before giving the same to the display control means 110, an external memory 111 which stores data, with performing region segmentation for different types of image data such as encoding target image, a sub-picture, a display image, and graphics, DMA control means 112 for controlling the DMA between the image input/output processing means 100 or the processor means 116 and the external memory 111, DMA settings holding means 113 for holding respective setting information for performing the DMA control, address generating means 114 for generating an address of the external memory 111 in accordance with the DMA setting information, DRAM control means 115 for controlling writing or reading of the external memory 111, the processor 116 which can be controlled by programs, encoding/decoding processing means 117 for processing an image of the external memory 111 or code data by program control, and a DMA bus 118 which performs DMA between the input image buffer 102, the previous frame image buffer 103, the sub-picture generation input buffer 104, the sub-picture generation output buffer 106, the sub-picture buffer 107, the main picture buffer 108, the graphics buffer 109, the processor means 116, and the external memory 111, DMA request generating means 119 for generating a DMA request timing of the image input and output processing means 100 and the external memory 111 on the basis of a video synchronizing signal, and DMA request adjustment means 120 for, when making the DMA request from the DMA request generating means 119 and the DMA request from the processor means 116, adjusting the DMA requests so as to preferentially execute the DMA request from the DMA request generating means 119.

Further, structures of the image input/output processing means 100, the input control means 101, the sub-picture generating means 105, the display control means 110, the DRAM control means 115, the processor means 116, the encoding/decoding means 117, and the DMA bus 118 among members composing the image processing apparatus A are identical to those of the respective component members having the corresponding same names in the above-described image processing apparatus X, i.e., the image input/output processing means 500, the input control means 501, the sub-picture generating means 505, the display control means 510, the DRAM control means 515, the processor means 516, the encoding/decoding means 517, and the DMA bus 518, respectively.

In addition, the input image buffer 102, the previous frame image buffer 103, the sub-picture generation input buffer 104, the sub-picture generation output buffer 106, the sub-picture buffer 107, the main picture buffer 108, and the graphics buffer 109 among members composing the image processing apparatus A are identical to the respective component members having the corresponding same names in the above-described image processing apparatus X, i.e., the input image buffer 502, the previous frame image buffer 503, the sub-picture generation input buffer 504, the sub-picture generation output buffer 506, the sub-picture buffer 507, the main picture buffer 508, and the graphics buffer 509 in points of these functions, though the former is different from the latter in points of the capacity.

Figure 2:
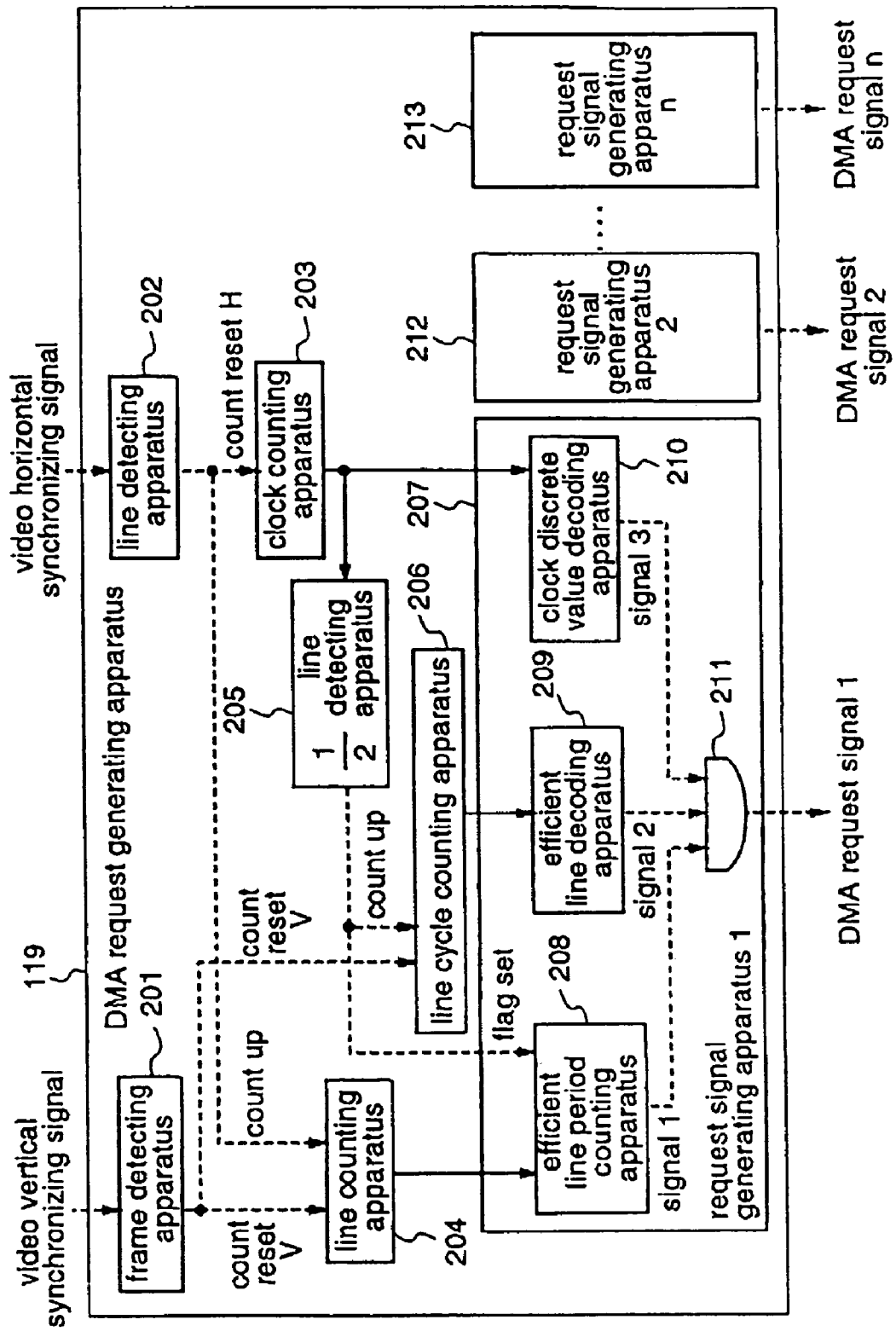
FIG. 2 is a structural block diagram of a DMA request generating means composing the image processing apparatus according to the first embodiment of the present invention.

FIG. 2 is a structural block diagram of the DMA request generation means 119.

This DMA request generating means 119 is composed of frame detecting means 201 for detecting the frame head from a video vertical synchronizing signal, line detecting means 202 for detecting the line head from a video horizontal synchronizing signal, clock counting means 203 for counting an operation clock after receiving a line head signal from the line detecting means 202 to reset a discrete value, line counting means 204 for counting the line head signal from the line detecting means 202 after receiving the frame head signal from the frame detecting means 201 to reset the discrete value, 1/2 line detecting means 205 for detecting the start time of the DMA in burst transfer units which can be previously subjected to the DMA scheduling, from the discrete value of the clock counting means 203, line cycle counting means 206 for counting the line detecting signal from the 1/2 line detecting means 205 after resetting the discrete value by the frame head signal from the frame detecting means 201 and one cycle end signal, first request signal generating means 207 for generating the DMA request signal from the discrete values of the clock counting means 203, the line cycle counting means 206, and line counting means 204, efficient line period detecting means 208 for detecting an efficient line period from the discrete value of the line counting means 203 and the detecting signal of the 1/2 line detecting means 205, efficient line detecting means 209 for detecting an efficient line from the discrete value of the line cycle counting means 206, request signal detecting means 210 for detecting the request timing of the DMA from the discrete value of the clock counting means 203, an AND circuit 211, second request signal generating means 212 which has the similar structure to that of the first request signal generating means 207 and generates the DMA request signal of the other data which can be previously subjected to the DMA scheduling, and Nth request signal generating means 213. Further, N denotes the number of data types which can be previously subjected to the DMA scheduling.

Hereinafter, the image processing apparatus A so constructed will be described.

Initially, an input image is always input with synchronized with a video synchronizing signal at a constant rate. After the input image is input to the input control means 101, the input control means 101 performs resolution conversion of the input image into the image size to be encoded. Thereafter, the input control means 101 temporarily stores the same in the input image buffer.

As an example, tables 1 and 2 show line timings in the case of performing resolution conversion of an NTSC interlaced size in which an efficient input image size is 704 pixels×240 lines×2 fields into a CIF size in which an intensity and a color difference are 352 pixels×288 lines and 176 pixels×144 lines, respectively.

TABLE 1

| line number | efficient intensity data output | |
|---|---|---|
| 1 | | ↑ |
| 2 | | |
| . | | inefficient period |
| . | | |
| . | | |
| 22 | | |
| 23 | | |
| 24 | | ↓ |
| 25 | 1 | ↑ |
| 26 | 2 | |
| 27 | 3 | |
| 28 | 4  5 | pattern A |
| 29 | 6 | ↓ |
| . | . | ↑ |
| . | . | |
| . | . | |
| 260 | 283 | repetition of pattern A |
| 261 | 284 | |
| 262 | 285 | |
| 263 | 286  287 | |
| 264 | 288 | ↓ |
| 265 | | |
| 266 | | |
| . | | inefficient period |
| . | | |
| . | | |
| 525 | | ↓ |

TABLE 2

| line number | efficient color difference data output |
|---|---|
| 1 | |
| 2 | |
| . | |
| . | |
| . | |
| 22 | |
| 23 | |
| 24 | 1 |
| 25 | |
| 26 | 2 |
| 27 | 3 |
| 28 | |
| 29 | 4 |
| . | . |
| . | . |
| . | . |
| 260 | |
| 261 | 143 |
| 262 | 144 |
| 263 | |
| 264 | |
| 265 | |
| 266 | |
| . | |
| . | |
| . | |
| 525 | | inefficient period
pattern B
repetition of pattern B
inefficient period

TABLE 3

| line number | intensity data DMA |
|---|---|
| 1 | |
| 2 | |
| . | |
| . | |
| . | |
| 22 | |
| 23 | |
| 24 | |
| 25 | 1 |
| 26 | 2 |
| 27 | 3 |
| 28 | 4 |
| 29 | 5    6 |
| . | . |
| . | . |
| . | . |
| 260 | 283 |
| 261 | 284 |
| 262 | 285 |
| 263 | 286 |
| 264 | 287    288 |
| 265 | |
| 266 | |
| . | |
| . | |
| . | |
| 525 | | inefficient period
pattern C
repetition of pattern C
inefficient period

TABLE 4

| line number | color difference data DMA |
|---|---|
| 1 | |
| 2 | |
| . | |
| . | |
| . | |
| 22 | |
| 23 | |
| 24 | 1 |
| 25 | |
| 26 | 2 |
| 27 | 3 |
| 28 | |
| 29 | 4 | inefficient period
pattern D

In tables 1 and 2, the "line number" is the line number of the input image. In the case of the NTSC image, the line number is either value of 1 through 525, and the 22nd line through the 261st line and 285th line through 524th line are used as efficient lines. Further, the "efficient intensity data output" shows the output line timing of the efficient intensity data after performing resolution conversion, and the "efficient color difference data output" shows the output line timing of the efficient color difference data after performing resolution conversion. Both of two pieces of color difference data Cb and Cr have the identical line timings.

Next, tables 3 and 4 show the line timings when performing the DMA of image data which is subjected to resolution conversion by the input control means 101 through the input image buffer 102 to the external memory 111.

TABLE 4-continued

| line number | | |
|---|---|---|
| . | . | |
| . | . | |
| . | . | |
| 260 | | repetition of pattern D |
| 261 | 143 | |
| 262 | 144 | |
| 263 | | |
| 264 | | |
| 265 | | |
| 266 | | |
| . | | inefficient period |
| . | | |
| . | | |
| 525 | | |

In tables 3 and 4, the "line number" is the line number of the input image. The "intensity data DMA" shows the line timing for performing the DMA of the intensity data to the external memory 111, and the "color difference data DMA" shows the line timing for performing the DMA of the color difference data to the external memory 111.

In this image processing apparatus A, an actual DMA starts from the time when half of the one line time passes. For example, the first line of the intensity data of the CIF size is output from the input control means 101 in the line number 25, and the DMA is performed between the latter half of the line number 25 and the first half of the line number 26. It is known from table 3 that the intensity data of the 5th and 6th lines among the intensity data of the CIF size performs the DMA of two lines of the CIF size during one line period from the latter half of the line number 29 to the first half of the line number 30.

Here, the input control means 101 performs noise removal processing of the input image by using the previous frame image. In this case, the previous frame image stored in the external memory 111 is subjected to the DMA to the previous frame image buffer 103, and noise removal processing is performed while reading the previous frame image from the previous frame image buffer 103.

In addition, table 5 shows the line timings when performing the DMA of the previous frame image from the external memory 111 to the previous frame image buffer 103. Here, noise removal processing is performed only with respect to the intensity data, resulting in performing the DMA of only the intensity data.

TABLE 5

| line number | intensity data DMA | |
|---|---|---|
| 1 | | inefficient period |
| 2 | | |
| . | | |
| . | | |
| . | | |
| 22 | | |
| 23 | | |
| 24 | 1 | pattern C |
| 25 | 2 | |
| 26 | 3 | |
| 27 | 4 | |
| 28 | 5 6 | |
| 29 | 7 | |

| | | |
|---|---|---|
| . | . | |
| . | . | |
| . | . | |
| 260 | 284 | repetition of pattern C |
| 261 | 285 | |
| 262 | 286 | |
| 263 | 287 288 | |
| 264 | | |
| 265 | | |
| 266 | | |
| . | | inefficient period |
| . | | |
| . | | |
| 525 | | |

On the other hand, when the display image which is stored in the external memory 111 is displayed as the sub-picture, the sub-picture generating means 105 performs resolution conversion of the display image which is transferred from the external memory 111 through the sub-picture generation input buffer 104 into the sub-picture size to temporarily store in the sub-picture generation output buffer 106. Thereafter, the resolution-converted display image is transferred from the sub-picture generation output buffer 106 to the external 111.

Table 6 shows the line timings when performing the DMA of the display image data of the intensity 704 pixels×480 lines and the color difference 352 pixels×480 lines from the external memory 111 to the sub-picture generation input buffer 104. In this table 6, the intensity data and the color difference data has the identical line timings.

TABLE 6

| line number | intensity, color difference data DMA | |
|---|---|---|
| 1 | | ⎫ inefficient period |
| . | | |
| . | | |
| . | | |
| 21 | 1 | ⎫ pattern E |
| 22 | 2 | |
| 23 | 3 | |
| 24 | 4 | |
| 25 | 5 | ⎫ repetition of pattern E |
| . | . | |
| . | . | |
| . | . | |
| 260 | 240 | |
| 261 | | |

| . | | ⎫ inefficient period |
|---|---|---|
| . | | |
| . | | |
| 284 | 241 | |
| 285 | 242 | |
| 286 | 243 | ⎫ repetition of pattern E |
| . | . | |
| . | . | |
| . | . | |
| 522 | 479 | |
| 523 | 480 | |
| 524 | | ⎫ inefficient period |
| 525 | | |

In table 6, when the line number is the line number of the display image and in the NTSC image, it is either value of 1 through 525, and 22nd line through 261st line and 285th line through 524th line are used as efficient display lines.

Further, table 7 shows the line timings when performing the DMA of the generation sub-picture data of the intensity 352 pixels×240 lines and the color difference 176 pixels×240 lines from the sub-picture generation output buffer 106 to the external memory 111.

TABLE 7

| line number | intensity, color difference data DMA | |
|---|---|---|
| 1 | | ⎫ inefficient period |
| . | | |
| . | | |
| . | | |
| 22 | | ⎫ pattern F |
| 23 | 1 | |
| 24 | | |
| 25 | 2 | |
| 26 | | ⎫ repetition of pattern F |
| . | . | |
| . | . | |
| . | . | |
| 260 | | |
| 261 | 120 | |

| . | | ⎫ inefficient period |
|---|---|---|
| . | | |
| . | | |
| 284 | | |
| 285 | | |
| 286 | 121 | |
| . | . | ⎫ repetition of pattern F |
| . | . | |
| . | . | |
| 522 | 239 | |
| 523 | | |
| 524 | 240 | ⎫ inefficient period |
| 525 | | |

On the other hand, the display control means 110 reads the sub-picture, the main picture, and the graphics data from the sub-picture buffer 107, the main picture buffer 108, and the graphics buffer 109, respectively, and, after display composition, synchronizes the same with the video synchronizing signal as the display image to output at a constant rate.

Table 8 shows the line timings in the case where the display position of the sub-picture is in the lower right hand corner of the display monitor and when performing the DMA of the sub-picture data of the intensity 352 pixels×240 lines and the color difference 176 pixels×240 lines from the external memory 111 to the sub-picture buffer 107.

TABLE 8

| line number | intensity, color difference data DMA | |
|---|---|---|
| 1 | | ↑ |
| . | | |
| . | | inefficient period |
| . | | |
| 140 | | |
| 141 | | ✗ |
| 142 | 1 | pattern G |
| 143 | 2 | ✗ |
| 144 | 3 | |
| . | . | |
| . | . | repetition of pattern G |
| . | . | |
| 260 | 119 | |
| 261 | 120 | ↓ |
| . | . | ↑ |
| . | . | inefficient period |
| . | . | |
| 403 | | |
| 404 | | |
| 405 | 121 | ✗ |
| . | . | |
| . | . | repetition of pattern G |
| . | . | |
| 522 | 238 | |
| 523 | 239 | |
| 524 | 240 | |
| 525 | | ✗ inefficient period ↓ |

Tables 9 and 10 show the line timings when performing the DMA of the main picture data of the intensity 352 pixels×576 lines and the color difference 176 pixels×288 lines from the external memory 111 to the main picture buffer 108.

TABLE 9

| line number | intensity data DMA | |
|---|---|---|
| 1 | | ↑ |
| . | | |
| . | | inefficient period |
| . | | |
| 20 | 1   2 | ✗ |
| 21 | 3 | pattern H |
| 22 | 4 | |
| 23 | 5 | |
| 24 | 6 | ✗ |
| . | . | |
| . | . | repetition of pattern H |
| . | . | |
| 258 | 287 | |
| 259 | 288 | ↓ |

TABLE 9-continued

| | | |
|---|---|---|
| . | | ↑ |
| . | | inefficient period |
| . | | |
| 283 | 289   290 | ✗ |
| 284 | 291 | |
| 285 | 292 | |
| . | . | repetition of pattern H |
| . | . | |
| . | . | |
| 521 | 575 | |
| 522 | 576 | |
| 523 | | ✗ |
| 524 | | inefficient period |
| 525 | | ↓ |

TABLE 10

| line number | color difference data DMA | |
|---|---|---|
| 1 | | ↑ |
| . | | |
| . | | inefficient period |
| . | | |
| 19 | 1 | ✗ special pattern ✗ |
| 20 | 2 | |
| 21 | 3 | pattern J |
| 22 | 4 | |
| 23 | | ✗ |
| 24 | | |
| . | . | |
| . | . | repetition of pattern J |
| . | . | |
| 254 | | |
| 255 | 143 | ✗ special pattern ✗ |
| 256 | 144 | |
| . | . | ↑ special pattern |
| . | . | |
| . | . | |
| 282 | 145 | |
| 283 | 146 | |
| 284 | 147 | inefficient period |
| . | . | |
| . | . | |
| . | . | |
| 517 | | |
| 518 | 287 | ✗ special pattern ✗ |
| 519 | 288 | ✗ special pattern ✗ |
| . | . | |
| . | . | inefficient period |
| . | . | |
| 525 | | ↓ |

Further, table 11 shows the line timings when performing the DMA of the graphics data of 352×480 lines from the external memory 111 to the graphics buffer 109.

TABLE 11

| line number | graphics data DMA | |
|---|---|---|
| 1 | | ↑ |
| . | | inefficient period |
| . | | |
| . | | |
| 21 | 1 | ✗ pattern K |
| 22 | 2 | ✗ |
| 23 | 3 | |
| 24 | 4 | repetition of pattern K |
| 25 | 5 | |
| . | . | |
| . | . | |
| . | . | |
| 259 | 239 | |
| 260 | 240 | ↓ |

TABLE 11-continued

| | | |
|---|---|---|
| . | | ↑ inefficient period |
| . | | |
| . | | |
| 284 | 241 | ✗ |
| 285 | 242 | |
| 286 | 243 | |
| . | . | repetition of pattern K |
| . | . | |
| . | . | |
| 522 | 479 | |
| 523 | 480 | |
| 524 | | ✗ inefficient period |
| 525 | | ↓ |

As described above, the DMA line timings between the external memory 111 and each buffer have been described. Next, the DMA scheduling during one line period will be described.

Tables 12, 13, 14 and 15 show the DMA request timings during one line period, and one line period is divided into 20 and is further divided into 4 to arrange the DMA which can be previously scheduled. The DMA size which is executed by one DMA request is 88 bytes, and the DMA operation frequency is 67.5 MHz. When the DMA bus width is 16 bits, one DMA is 44 cycles.

TABLE 12

| | | input image buffer DMA | | | | previous frame image buffer DMA | | sub-picture generation input buffer DMA | | |
|---|---|---|---|---|---|---|---|---|---|---|
| | | intensity data | | | | intensity data | | | | |
| division No. | 67.5 MHz clock number | at 1 line DMA | at 2-line DMA | color difference Cb data | color difference Cr data | at 1 line DMA | at 2-line DMA | intensity data | color difference Cb data | color difference Cr data |
| 10 | 0 | 2150 | | | | ○ | ○ | | | |
| | 1 | 2194 | ○ | ○ | | | | | | |
| | 2 | 2238 | | | | | | | | |
| | 3 | 2282 | | | | | | | | |
| 11 | 0 | 2365 | | | | | | ○ | | |
| | 1 | 2409 | | | | | | | ○ | |
| | 2 | 2453 | | | | | | | | ○ |
| | 3 | 2497 | | | | | | | | |
| 12 | 0 | 2580 | | | | | | | | |
| | 1 | 2624 | | | | | | | | |
| | 2 | 2668 | | ○ | | | | ○ | | |
| | 3 | 2712 | | | | | | | | |
| 13 | 0 | 2795 | | | ○ | | | | | |
| | 1 | 2839 | | | | | | | | |
| | 2 | 2883 | | | | | | ○ | | |
| | 3 | 2927 | | | | | | | | |
| 14 | 0 | 3010 | | | | | | | | |
| | 1 | 3054 | | | | | | | | |
| | 2 | 3098 | | | | | | | | |
| | 3 | 3142 | | | | | | | | |
| 15 | 0 | 3225 | | | | | | ○ | ○ | |
| | 1 | 3269 | ○ | ○ | | | | | | |
| | 2 | 3313 | | | | | | | | |
| | 3 | 3357 | | | | | | | | |
| 16 | 0 | 3440 | | | | | | ○ | | |
| | 1 | 3484 | | | | | | | ○ | |
| | 2 | 3528 | | | | | | | | ○ |
| | 3 | 3572 | | | | | | | | |

TABLE 12-continued

| division No. | | 67.5 MHz clock number | input image buffer DMA | | | | previous frame image buffer DMA | | sub-picture generation input buffer DMA | | |
|---|---|---|---|---|---|---|---|---|---|---|---|
| | | | intensity data | | color difference Cb data | color difference Cr data | intensity data | | intensity data | color difference Cb data | color difference Cr data |
| | | | at 1 line DMA | at 2-line DMA | | | at 1 line DMA | at 2-line DMA | | | |
| 17 | 0 | 3655 | | | | | | | | | |
| | 1 | 3699 | | | | | | | | | |
| | 2 | 3743 | ○ | | | | | ○ | | | |
| | 3 | 3787 | | | | | | | | | |
| 18 | 0 | 3870 | | | | ○ | | | | | |
| | 1 | 3914 | | | | | | | | | |
| | 2 | 3958 | | | | | | | ○ | | |
| | 3 | 4002 | | | | | | | | | |
| 19 | 0 | 4085 | | | | | | | | | |
| | 1 | 4129 | | | | | | | | | |
| | 2 | 4173 | | | | | | | | | |
| | 3 | 4217 | | | | | | | | | |

TABLE 13

| division No. | | 67.5 MHz clock number | sub-picture generation output buffer DMA | | | sub-picture buffer DMA | | | main picture buffer DMA | | | | graphics buffer DMA |
|---|---|---|---|---|---|---|---|---|---|---|---|---|---|
| | | | intensity data | color difference Cb data | color difference Cr data | intensity data | color difference Cb data | color difference Cr data | intensity data | | color difference Cb data | color difference Cr data | |
| | | | | | | | | | at 1 line DMA | at 2-line DMA | | | |
| 10 | 0 | 2150 | | | | | | | | | | | |
| | 1 | 2194 | | | | | | | | | | | |
| | 2 | 2238 | | | | | | | ○ | ○ | | | |
| | 3 | 2282 | | | | | | | | | | | |
| 11 | 0 | 2365 | | | | | | | | | | | |
| | 1 | 2409 | | | | | | | | | | | |
| | 2 | 2453 | | | | | | | | | | | |
| | 3 | 2497 | | | | | | | | | | | |
| 12 | 0 | 2580 | | ○ | | | | | | | | | |
| | 1 | 2624 | | | | | ○ | | | | | | |
| | 2 | 2668 | | | | | | | | | ○ | | |
| | 3 | 2712 | | | | | | | | | | | |
| 13 | 0 | 2795 | | | | | | | | | | | |
| | 1 | 2839 | | | | | | | | | ○ | | |
| | 2 | 2883 | | | | | | | | | | | |
| | 3 | 2927 | | | | | | | | | | | |
| 14 | 0 | 3010 | | | | | | | | | | | ○ |
| | 1 | 3054 | ○ | | | | | | | | | | |
| | 2 | 3098 | | | | ○ | | | | | | | |
| | 3 | 3142 | | | | | | | | | | | |
| 15 | 0 | 3225 | | | | | | | | | | | |
| | 1 | 3269 | | | | | | | | | | | |
| | 2 | 3313 | | | | | | | ○ | ○ | | | |
| | 3 | 3357 | | | | | | | | | | | |
| 16 | 0 | 3440 | | | | | | | | | | | |
| | 1 | 3484 | | | | | | | | | | | |
| | 2 | 3528 | | | | | | | | | | | |
| | 3 | 3572 | | | | | | | | | | | |
| 17 | 0 | 3655 | | | ○ | | | | | | | | |
| | 1 | 3699 | | | | | | | | ○ | | | |
| | 2 | 3743 | | | | | | | | | ○ | | |
| | 3 | 3787 | | | | | | | | | | | |
| 18 | 0 | 3870 | | | | | | | | | | | |
| | 1 | 3914 | | | | | | | | | | ○ | |
| | 2 | 3958 | | | | | | | | | | | |
| | 3 | 4002 | | | | | | | | | | | |
| 19 | 0 | 4085 | | | | | | | | | | | ○ |
| | 1 | 4129 | ○ | | | | | | | | | | |
| | 2 | 4173 | | | | ○ | | | | | | | |
| | 3 | 4217 | | | | | | | | | | | |

TABLE 14

| division No. | | 67.5 MHz clock number | input image buffer DMA | | | | previous frame image buffer DMA | | sub-picture generation input buffer DMA | | |
|---|---|---|---|---|---|---|---|---|---|---|---|
| | | | intensity data | | color difference Cb data | color difference Cr data | intensity data | | intensity data | color difference Cb data | color difference Cr data |
| | | | at 1 line DMA | at 2-line DMA | | | at 1 line DMA | at 2-line DMA | | | |
| 0 | 0 | 0 | | | | | ○ | ○ | | | |
| | 1 | 44 | ○ | ○ | | | | | | | |
| | 2 | 88 | | | | | | | | | |
| | 3 | 132 | | | | | | | | | |
| 1 | 0 | 215 | | | | | | | ○ | | |
| | 1 | 259 | | | | | | | | ○ | |
| | 2 | 303 | | | | | | | | | ○ |
| | 3 | 347 | | | | | | | | | |
| 2 | 0 | 430 | | | | | | | | | |
| | 1 | 474 | | | | | | | | | |
| | 2 | 518 | | ○ | | | | ○ | | | |
| | 3 | 562 | | | | | | | | | |
| 3 | 0 | 645 | | | ○ | | | | | | |
| | 1 | 689 | | | | | | | | | |
| | 2 | 733 | | | | | | | ○ | | |
| | 3 | 777 | | | | | | | | | |
| 4 | 0 | 860 | | | | | | | | | |
| | 1 | 904 | | | | | | | | | |
| | 2 | 948 | | | | | | | | | |
| | 3 | 992 | | | | | | | | | |
| 5 | 0 | 1075 | | | | | ○ | ○ | | | |
| | 1 | 1119 | ○ | ○ | | | | | | | |
| | 2 | 1163 | | | | | | | | | |
| | 3 | 1207 | | | | | | | | | |
| 6 | 0 | 1290 | | | | | | | ○ | | |
| | 1 | 1334 | | | | | | | | ○ | |
| | 2 | 1378 | | | | | | | | | ○ |
| | 3 | 1422 | | | | | | | | | |
| 7 | 0 | 1505 | | | | | | | | | |
| | 1 | 1549 | | | | | | | | | |
| | 2 | 1593 | | ○ | | | | ○ | | | |
| | 3 | 1637 | | | | | | | | | |
| 8 | 0 | 1720 | | | | ○ | | | | | |
| | 1 | 1764 | | | | | | | | | |
| | 2 | 1808 | | | | | | | ○ | | |
| | 3 | 1852 | | | | | | | | | |
| 9 | 0 | 1935 | | | | | | | | | |
| | 1 | 1979 | | | | | | | | | |
| | 2 | 2023 | | | | | | | | | |
| | 3 | 2067 | | | | | | | | | |

TABLE 15

| division No. | | 67.5 MHz clock number | sub-picture generation output buffer DMA | | | sub-picture buffer DMA | | | main picture buffer DMA | | | | graphics buffer DMA |
|---|---|---|---|---|---|---|---|---|---|---|---|---|---|
| | | | intensity data | color difference Cb data | color difference Cr data | intensity data | color difference Cb data | color difference Cr data | intensity data | | color difference Cb data | color difference Cr data | |
| | | | | | | | | | at 1 line DMA | at 2-line DMA | | | |
| 0 | 0 | 0 | | | | | | | | | | | |
| | 1 | 44 | | | | | | | | | | | |
| | 2 | 88 | | | | | | | ○ | ○ | | | |
| | 3 | 132 | | | | | | | | | | | |
| 1 | 0 | 215 | | | | | | | | | | | |
| | 1 | 259 | | | | | | | | | | | |
| | 2 | 303 | | | | | | | | | | | |
| | 3 | 347 | | | | | | | | | | | |
| 2 | 0 | 430 | | ○ | | | | | | | | | |
| | 1 | 474 | | | | ○ | | | | | | | |
| | 2 | 518 | | | | | | | | | ○ | | |
| | 3 | 562 | | | | | | | | | | | |
| 3 | 0 | 645 | | | | | | | | | | | |

TABLE 15-continued

| division No. | | 67.5 MHz clock number | sub-picture generation output buffer DMA | | | sub-picture buffer DMA | | | main picture buffer DMA | | | | graphics buffer DMA |
|---|---|---|---|---|---|---|---|---|---|---|---|---|---|
| | | | | | | | | | intensity data | | | | |
| | | | intensity data | color difference Cb data | color difference Cr data | intensity data | color difference Cb data | color difference Cr data | at 1 line DMA | at 2-line DMA | color difference Cb data | color difference Cr data | |
| | 1 | 689 | | | | | | | | | ○ | | |
| | 2 | 733 | | | | | | | | | | | |
| | 3 | 777 | | | | | | | | | | | |
| 4 | 0 | 860 | | | | | | | | | | | ○ |
| | 1 | 904 | ○ | | | | | | | | | | |
| | 2 | 948 | | | | ○ | | | | | | | |
| | 3 | 992 | | | | | | | | | | | |
| 5 | 0 | 1075 | | | | | | | | | | | |
| | 1 | 1119 | | | | | | | | | | | |
| | 2 | 1163 | | | | | | | ○ | ○ | | | |
| | 3 | 1207 | | | | | | | | | | | |
| 6 | 0 | 1290 | | | | | | | | | | | |
| | 1 | 1334 | | | | | | | | | | | |
| | 2 | 1378 | | | | | | | | | | | |
| | 3 | 1422 | | | | | | | | | | | |
| 7 | 0 | 1505 | | ○ | | | | | | | | | |
| | 1 | 1549 | | | | | ○ | | | | | | |
| | 2 | 1593 | | | | | | | | ○ | | | |
| | 3 | 1637 | | | | | | | | | | | |
| 8 | 0 | 1720 | | | | | | | | | | | |
| | 1 | 1764 | | | | | | | | | | ○ | |
| | 2 | 1808 | | | | | | | | | | | |
| | 3 | 1852 | | | | | | | | | | | |
| 9 | 0 | 1935 | | | | | | | | | | | ○ |
| | 1 | 1979 | ○ | | | | | | | | | | |
| | 2 | 2023 | | | | ○ | | | | | | | |
| | 3 | 2067 | | | | | | | | | | | |

In tables 12 through 15, the "division No." denotes the number when one line period is divided, the "67.5 MHz clock number" denotes the cycle number during one line period at 67.5 MHz clock, the "input image buffer DMA" denotes a type of the DMA from the input image buffer 102 to the external memory 111, the "1 line DMA" denotes the request timing when performing the DMA of one line of the CIF size during one line period, the "2-line DMA" denotes the request timing when performing the DMA of two lines of the CIF size during one line period, the "previous frame image buffer DMA" denotes the DMA from the external memory 111 to the previous frame image buffer 103, the "sub-picture generation input buffer DMA" denotes a type of the DMA from the external memory 111 to the sub-picture generation input buffer 104, the "sub-picture generation output buffer DMA" denotes a type of the DMA from the external memory 111 to the sub-picture generation output buffer 106, the "sub-picture buffer DMA" denotes a type of the DMA from the external memory 111 to the sub-picture buffer 107, the "main picture buffer DMA" denotes a type of the DMA from the external memory 111 to the main picture buffer 108, and the "graphics buffer DMA" denotes a type of the DMA from the external memory 111 to the graphics buffer 109.

The DMA request generating means 119 generates the DMA request signal at the timings shown by ○ in Tables 12 through 15.

Figure 3:
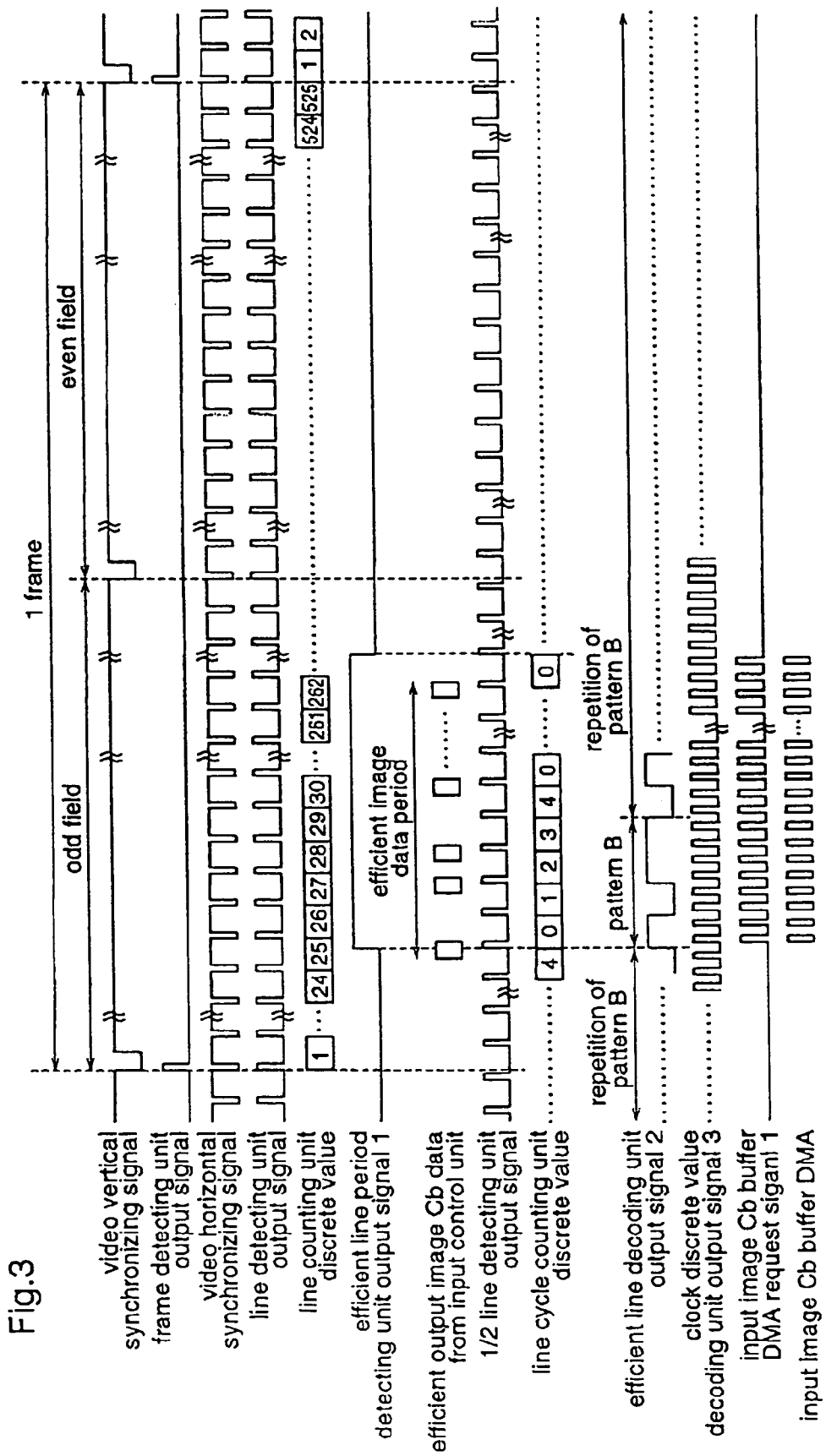
FIG. 3 is a diagram showing generation timings of the first DMA request signal generated in the DMA request generation means.

FIG. 3 shows generation timings of a first DMA request signal which is generated in the DMA request generating means 119, that is, the DMA request timings of color difference Cb data in the input image buffer DMA.

In FIG. 3, the "frame detecting means signal output" denotes a signal output timing showing the frame head of the frame detecting means 201, the "line detecting means signal output" denotes a signal output timing showing the line head of the line detecting means 202, the "line counting means discrete value" denotes a discrete value of a counter for initializing the discrete value by a signal output of the frame detecting means 201 and adding 1 to the discrete value by the signal output of the line detecting means 202, the "efficient line period detecting means signal output 1" denotes a signal 1 showing the efficient line period from the discrete value of the line counting means 204 and the signal output of the 1/2 line detecting means, the "efficient output image Cb data from input control means" denotes a Cb data timing of an image outputted from the input control means 101 to the input image buffer 102, the "1/2 line detecting means signal output" denotes 1/2 line time detected from the discrete value of the clock counting means 203, the "line cycle counting means discrete value" denotes the discrete value of the counter for initializing the discrete value by the signal output of the frame detecting means 201 or a final signal of the discrete value 4 and adding 1 to the discrete value by the signal output of the 1/2 line detecting means 205, the "efficient line decoding means signal output 2" denotes a signal 2 showing efficiency or inefficiency during one line period from the discrete value of the line cycle counting means 206, the "clock discrete value decoding signal output 3" denotes the request timing signal during one line period of the input image Cb buffer DMA obtained from the discrete value of the clock counting means 203, the "input image Cb buffer DMA request signal 1" denotes a DMA request signal 1 which is generated by obtaining AND of the efficient line period detecting means signal output 1, the efficient line decoding means signal output 2 and the clock discrete value decoding means signal output 3, and the "input image Cb buffer DMA" denotes the DMA timing which is executed by the input image Cb buffer DMA request signal 1.

Figure 4:
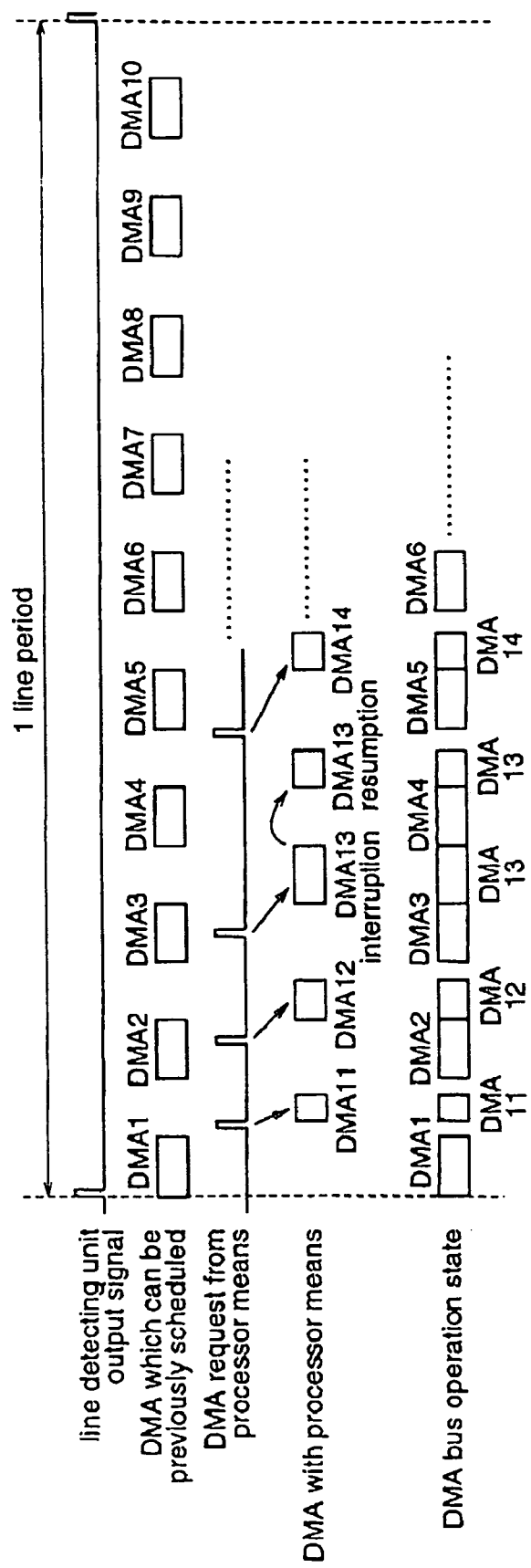
FIG. 4 is a diagram showing the adjustment relationship between the DMA which can be previously scheduled and the DMA of processor means.

FIG. 4 shows an example of the adjustment relationship between the DMA which can be previously scheduled and the DMA of the processor means 116.

When the DMA request adjusting means 120 receives the DMA request from the DMA request generating means 119, the DMA request adjusting means 120 performs adjustment so as to execute the same with higher priority than the DMA request of the processor means 116, and executes the same.

To be more specific, initially, a transfer data group which can be subjected to scheduling of the DMA is divided into burst transfer units (DMA1~DMA10), and the DMA is periodically performed for each of the divided units. Next, while this transfer data is not subjected to the DMA (between the DAM 1 and the DMA 2), the DMA of the processor means 116 as the transfer data which cannot be subjected to scheduling of the DMA is performed (DAM 11), and then this transfer data is transferred in accordance with the DMA request of the processor means 116. As the DMA bus operating state, the DMA 11 results in coming next to the DMA 1. Further, while the DMA of the processor means 116 as the transfer data which cannot be subjected to scheduling of the DMA is being performed (DMA 13), the DMA request which can be scheduled is made (DMA 4), and then the DMA 13 is once interrupted to preferentially perform the DMA 4. When the DMA 4 is completed, the DMA 13 is restarted to transfer the rest. In this case, the DMA bus operating state becomes DMA 3-DMA 13-DMA 4-DMA 13.

In this way, as shown in FIG. 4, when the DMA request is made from the processor 116 at the time when the DMA which can be previously scheduled is not executed, the DMA is immediately executed. If the DMA which can be scheduled is executed, after completing the same, the DMA of the processor means is successively executed.

Then, if the DMA request which can be scheduled is made under the execution of the DMA of the processor means which cannot be scheduled, the DMA of the processor means which is being executed is interrupted, and the DMA of the processor means is successively executed after executing the DMA which can be scheduled.

As described above, according to this embodiment, the DMA which can be subjected to the DMA scheduling is periodically executed with priority, and during the period that the DMA which can be subjected to DMA scheduling is not executed, the DMA which cannot be subjected to the DMA scheduling is executed, thereby avoiding the concentration of specific DMA. More particularly, the request signal of the DMA which can be subjected to the DMA scheduling is generated after 1/2 line of the time that the image input/output processing means outputs the request signal, or 1/2 line before the time required by the image input/output processing means, thereby reducing the buffer capacity of the image input/output processing means.

Embodiment 2

The image processing apparatus comprising the data transfer control apparatus in which, in the first embodiment described above, when the data transfer request with high priority is made, the data transfer which is being executed can be temporarily interrupted to start the transfer of data with high priority will be described with reference to the drawings.

Figure 5:
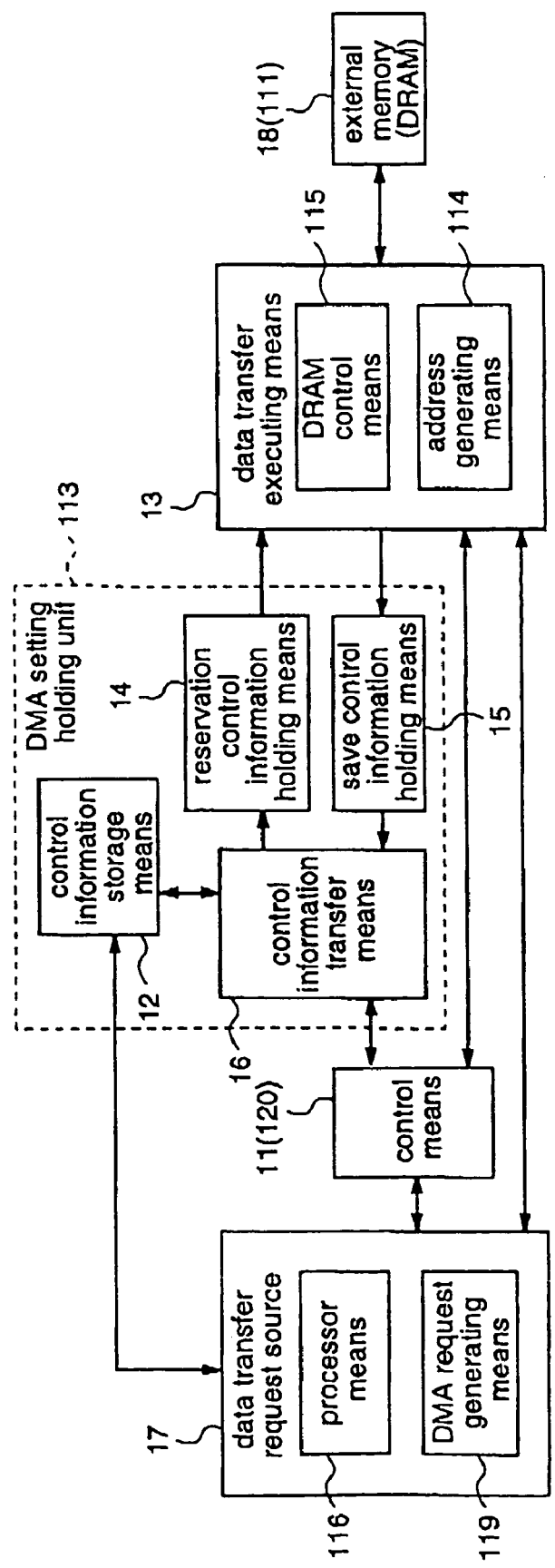
FIG. 5 is a block diagram showing a structure of a data transfer control apparatus in an image processing apparatus according to a second embodiment of the present invention.

FIG. 5 is a block diagram showing a structure of the data transfer control apparatus in the image processing apparatus A described in the first embodiment in advance. That is, the feature of the image processing apparatus according to the second embodiment is the data transfer control apparatus. Therefore, hereinafter, this part will be described. Further, component parts of the image processing apparatus except the data transfer control apparatus and the operation thereof are identical to those of the above-described image processing apparatus A. Therefore, the explanation thereof is omitted.

In FIG. 5, numeral 11 denotes control means for controlling each part composing the data transfer control apparatus, numeral 12 denotes control information storage means (first control information storage means) for storing control information required for data transfer control, numeral 13 denotes the data transfer executing means for executing the data transfer, numeral 14 denotes reservation control information holding means (second control information storage means) for temporarily holding control information required for data transfer which is executed next, and numeral 15 denotes save control information holding means (third control information storage means) for temporarily holding control information from the data transfer executing means 13. In addition, numeral 16 denotes control information transfer means for transferring control information from the control information storage means 12 to the reservation control information holding means 14, as well as storing control information from the save control information holding means 15 in the control information storage means 12. Numeral 17 denotes a data transfer request source for requesting the data transfer, and numeral 18 denotes a storage apparatus of the data transfer target.

Further, the DMA settings holding means 113 is composed of the control information storage means 12, the reservation control information holding means 14, the save control information holding means 15, and the control information transfer means 16. The control means 11 operates as the DMA request adjusting means 120. The processor means 116 and the DMA request generating unit 119 are included in the data transfer request source 17. In addition, the address generating means 114 and the DRAM control means 115 are included in the data transfer executing means 13.

Hereinafter, the operation of the data transfer control apparatus so constructed will be described.

The data transfer request source 17 requests the data transfer of the control means 11 when the data transfer between the data transfer request source 17 and the storage apparatus 18 is required. Here, priority information according to the emergency degree of the data transfer is included in the data transfer request.

The control means 11 receives the data transfer request, and then selects the data transfer to be executed next on the basis of the priority information. The control means 11 controls the control information transfer means 16 so as to obtain the control information required for the data transfer from the control information storage means 12 and hold the same in the reservation control information holding means 14.

The transfer of the control information to the reservation control information holding means 14 is completed, and then, when it is judged that the data transfer to be executed next (requested) has higher priority than the data transfer which is being executed in the data transfer executing means 13, the control means 11 requests the interruption of the data transfer which is being executed in the data transfer executing means 13. In addition, when the data transfer of the data transfer executing means 13 is interrupted, the control information required when the data transfer is restarted next is saved to the save control information holding means 15. Thereafter, the control information which is held in the reservation control information holding means 14 and is required for the next data transfer is transferred to the data transfer executing means 13, whereby the data transfer executing means 13 executes the next data transfer which is performed between the data transfer request source 17 and the storage apparatus 18 on the basis of the control information.

The control means 11 controls the control information transfer means 16 so as to store the control information required for again transferring the data which is saved to the save control information holding means 15 and the transfer of which is interrupted in the control information storage means 12.

The data transfer which is interrupted in order to execute the data transfer with high priority controls the control information transfer means 16 after completing the data transfer with high priority so that the reservation control information holding means 14 obtains the control information which is necessary for the data transfer resumption from the control information storage means 12 and transfers the same to the data transfer executing means 13, thereby restarting the data transfer.

Figure 6:
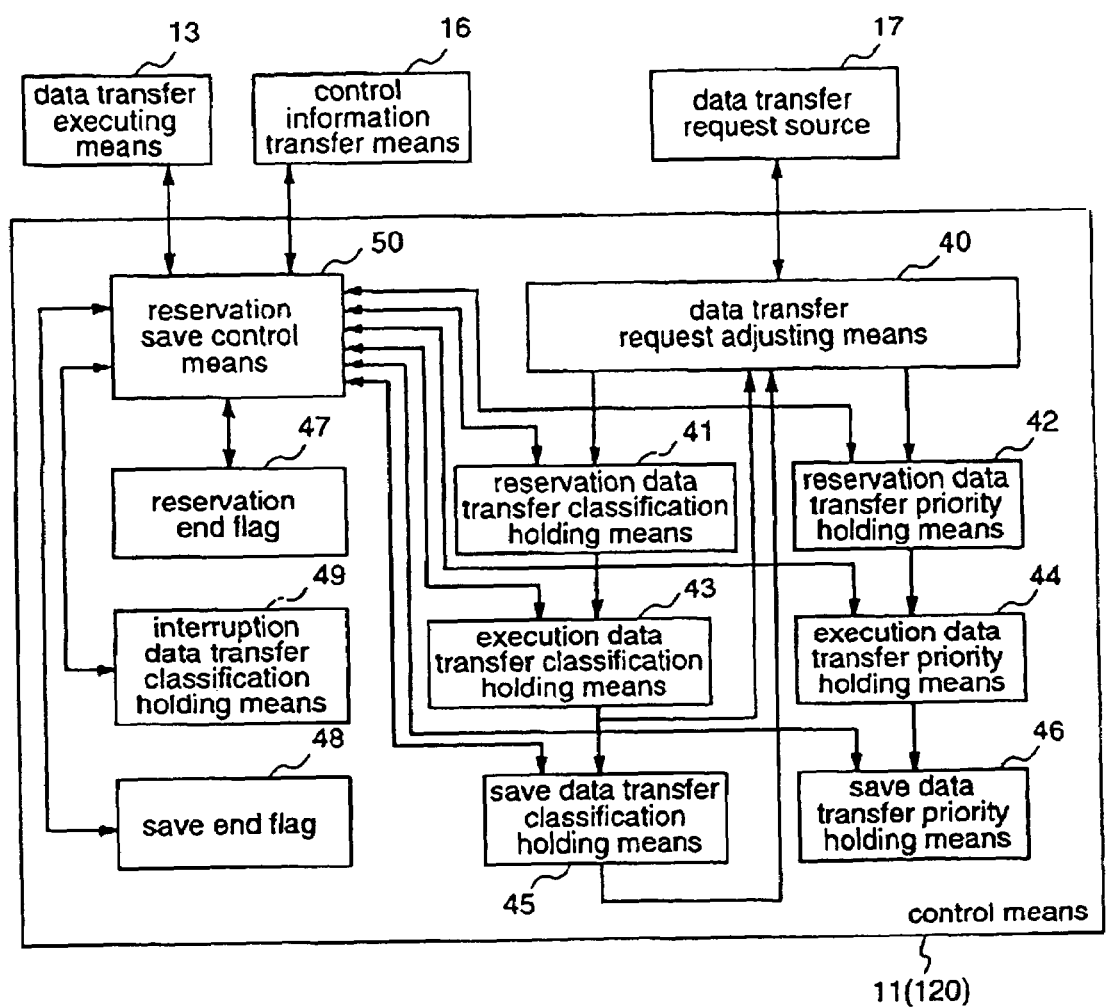
FIG. 6 is a block diagram showing a detailed structure of control means composing the data transfer control apparatus according to the second embodiment.

FIG. 6 is a block diagram showing a more detailed structure of the control means 11 as shown in FIG. 5.

In FIG. 6, numeral 40 denotes data transfer request adjusting means for receiving the data transfer request from the data transfer request source 17 and selecting the priority as compared with a classification of the data transfer to be executed next. Numeral 41 denotes reservation data transfer classification holding means (second data transfer classification holding means) for holding a classification of the data transfer corresponding to the control information held by the reservation control information holding means 14. Numeral 42 denotes reservation data transfer priority holding means (second data transfer priority holding means) for holding priority information corresponding to the control information held by the reservation control information holding means 14. Numeral 43 denotes execution data transfer classification holding means (first data transfer classification holding means) for holding a classification of the data transfer which is being executed in the data transfer executing means 13. Numeral 44 denotes execution data transfer priority holding means (first data transfer priority holding means) for holding the priority information of the data transfer which is being executed in the data transfer executing means 13. Numeral 45 denotes save data transfer classification holding means (third data transfer classification holding means) for holding a classification of the data transfer corresponding to the control information held by the save control information holding means 15. Numeral 46 denotes save data transfer priority holding means (third data transfer priority holding means) for holding the priority information of the data transfer corresponding to the control information held by the save control information holding means 15. Numeral 47 denotes a reservation end flag which shows completing the obtainment of the control information by the reservation control information holding means 14. Numeral 48 denotes a save end flag which shows completing the storage of the control information held by the save control information holding means 15 in the control information storage means 12. Numeral 49 denotes interruption data transfer classification holding means for holding a classification of the data transfer interrupted in the data transfer executing means 13. Numeral 50 denotes reservation save control means for executing control by using information of the data transfer request adjusting means 40, the reservation data transfer classification holding means 41, the reservation data transfer priority holding means 42, the execution data transfer classification holding means 43, the execution data transfer priority holding means 44, the save data transfer classification holding means 45, the save data transfer priority holding means 46, the reservation end flag 47, the save end flag 48, and the interruption data transfer classification holding means 49.

Figure 7:
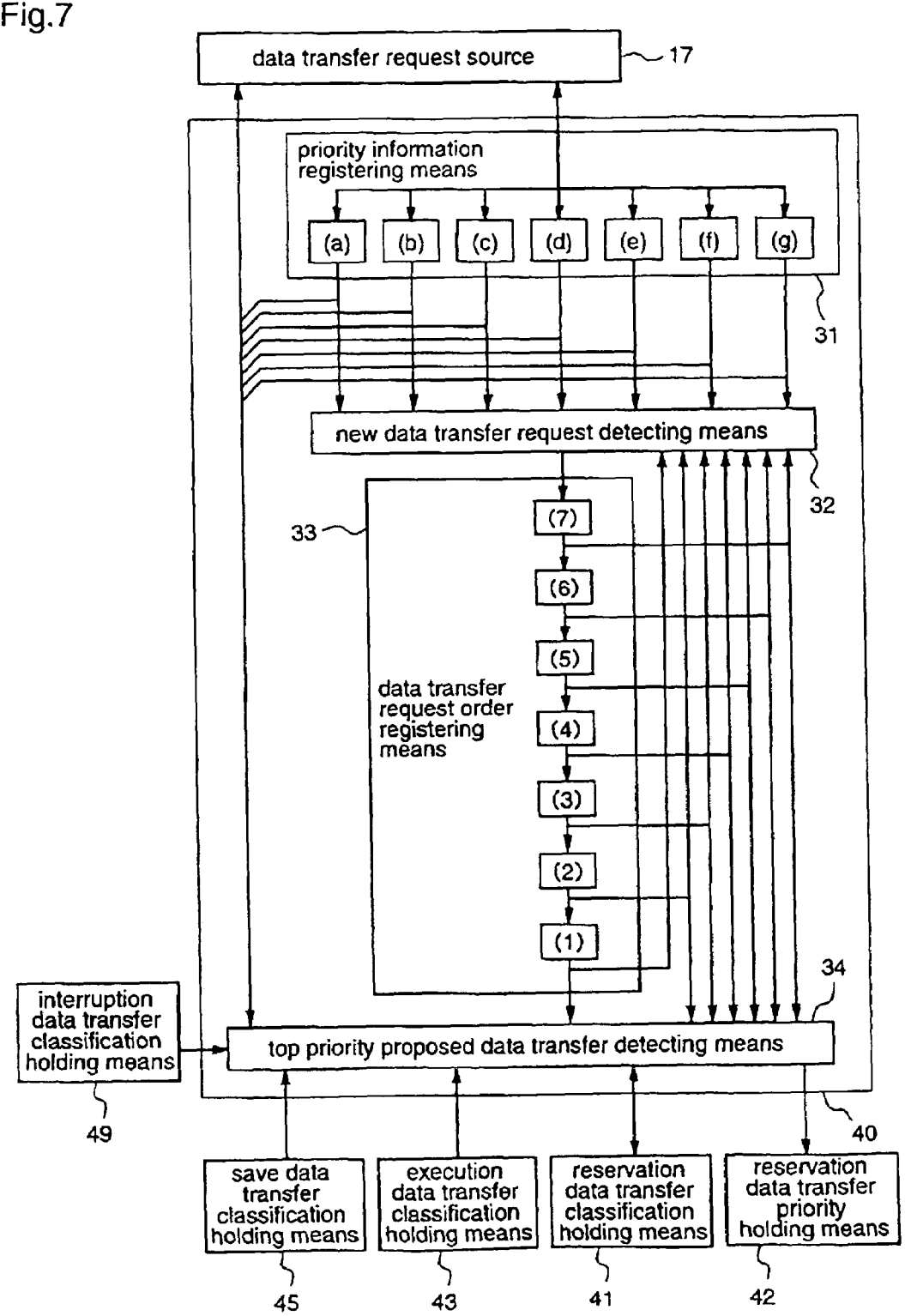
FIG. 7 is a block diagram of data transfer request adjusting means showing a detailed structure of the data transfer request adjusting means composing the control means as shown in FIG. 6.
Figure 8:
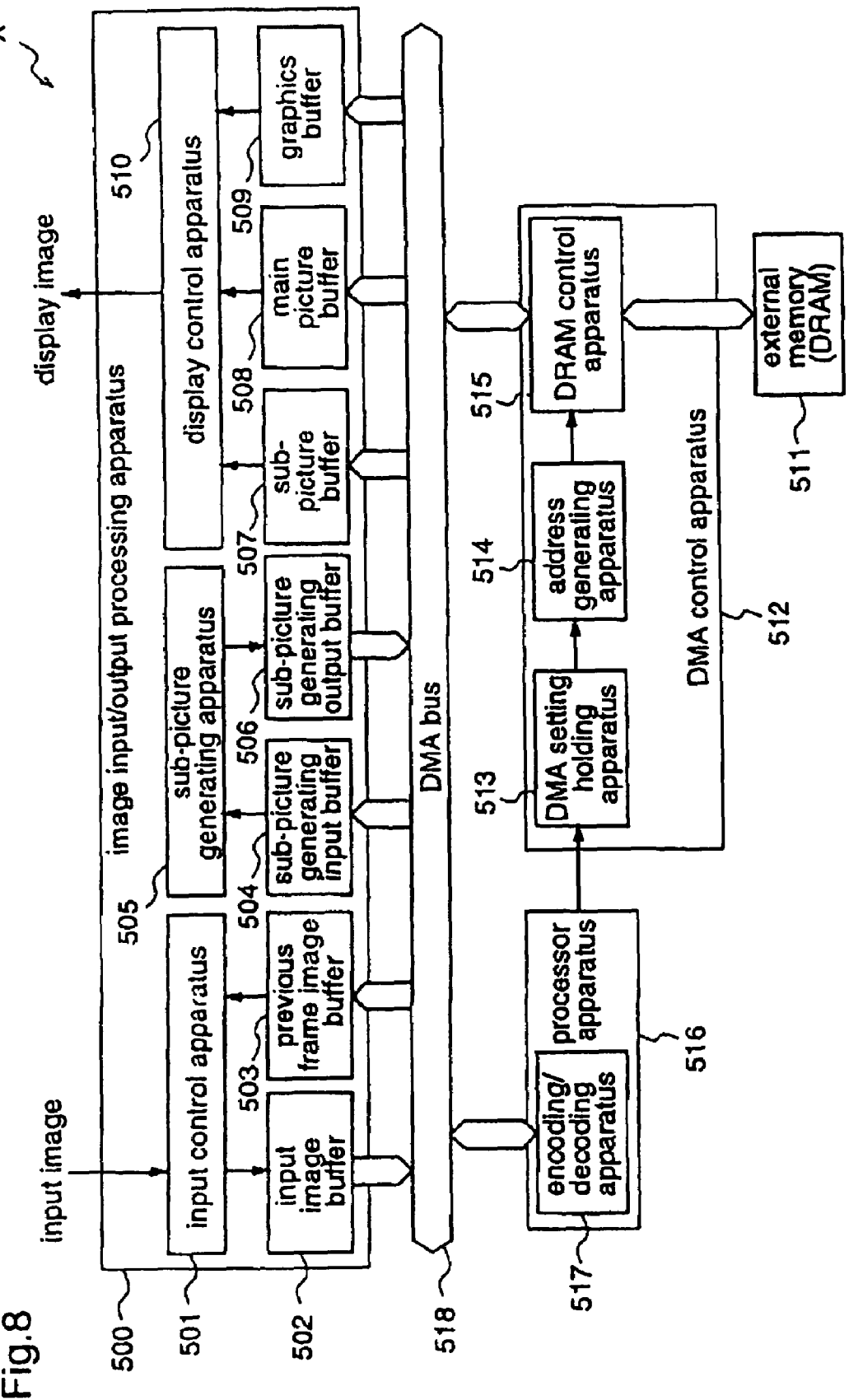
FIG. 8 is a structural block diagram of a conventional image processing apparatus.

FIG. 7 is a block diagram showing a more detailed structure of the data transfer request adjusting means 40 as shown in FIG. 6.

In FIG. 7, numeral 31 denotes priority information registering means for registering priority information of the received data transfer request. Numeral 32 denotes new data transfer request detecting means for detecting a classification of the data transfer request which is newly registered in the priority information registering means 31. Numeral 33 denotes data transfer request order registering means for registering a classification of the data transfer request detected by the new data transfer request detecting means 32 in order. Numeral 34 denotes top priority proposed data transfer detecting means for detecting the data transfer with top priority to be executed next from information registered in the priority information registering means 31 and the data transfer request order registering means 33 and information held in the reservation data transfer classification holding means 41, the execution data transfer classification holding means 43, the save data transfer classification holding means 45, and the interruption data transfer classification holding means 49.

Hereinafter, the operation of the data transfer request adjusting means 40 so constructed will be described.

The priority information registering means 31 registers the priority information corresponding to each of all data transfer classifications in order to receive the requests of all data transfer classifications from the data transfer request source 17. An example of FIG. 7 has seven types of data transfer classifications, (a), (b), (c), (d), (e), (f), and (g). Here, it is assumed that the transfer priority has three types of priorities, high priority, middle priority, and low priority. Here, when the data transfer request with low priority of the data transfer classification (c) is made from the data transfer request source 17, information showing low priority is registered in (c) of the priority information registering means 31.

The data transfer request order registering means 33 registers all data transfer classifications in order detected by the new data transfer request detecting means 32. An example of FIG. 7 has registration parts (1)~(7) corresponding to seven types of data transfer classifications. The data transfer classification registered in (1) is a classification of the data transfer request which is received earliest. The larger the number in parentheses, such as (2), (3), becomes, the more newly received data transfer classification is registered.

When the data transfer priority except the one corresponding to the data transfer classification registered in the data transfer request order registering means 33 is registered, the new data transfer request detection means 32 detects the data transfer classification as the one of the data transfer which is newly registered in the priority information registering means 31.

The top priority proposed data transfer detecting means 34 selects the data transfer request which is received earliest among the data transfer requests with highest priority of the received data transfer requests as the data transfer which is executed with top priority.

However, when the same data transfer classification as the data transfer classification of the control information which exists in the data transfer execution means 13, the reservation control information holding means 14, and the save control information holding means 15 is selected as the data transfer to be executed with top priority, a plurality of control information having the same data transfer classification inside the data transfer control apparatus exists, thereby causing a malfunction. Therefore, the data transfer classification of the control information which exists in the data transfer executing means 13, the reservation control information holding means 14, and the save control information holding means 15 is required to be excluded from the proposed selection. Therefore, the data transfer classification corresponding to the control information held by the reservation control information holding means 14 is held by the reservation data transfer classification holding means 41, the classification of the data transfer which is being executed in the data transfer execution means 13 is held by the execution data transfer classification holding means 43, and the classification of the data transfer corresponding to the control information held by the save control information holding means 15 is held by the save data transfer classification holding means 45. For example, when low priority, low priority, middle priority, low priority, high priority, and middle priority are registered in (a), (b), (c), (e), (f), and (g) of the priority information registering means 31, respectively, the data transfer classification (e), the data transfer classification (b), the data transfer classification (g), the data transfer classification (a), the data transfer classification (c), and the data transfer classification (f) are registered in (1), (2), (3), (4), (5) and (6) of the data transfer request order registering means 33, respectively, the data transfer classification (f) is held by the execution data transfer classification holding means 43, and the data transfer classification (g) is held by the save data transfer classification holding means 45, the top priority proposed data transfer detection means 34 outputs the data transfer classification (c) and middle priority which is the data transfer priority thereof as the data transfer to be executed next with top priority. Further, (d) of the priority information registering means 31 has no registration, and (7) of the data transfer request order registration means 33 also has no registration.

In addition, when the data transfer with equal or lower priority as compared with the priority of the interrupted data transfer wishes not to be executed prior to the resumption of the interrupted data transfer, it is possible by excluding the data transfer classification with lower priority than that of the data transfer classification of the interruption data transfer classification holding means 49, in which the data transfer classification interrupted in the data transfer executing means 13 is held, from the proposed selection.

For example, when the data transfer classification (g) is further held in the interruption data transfer classification holding means 49 in the example, there is no proposed data transfer to be executed next with top priority. When all the control information of the save control information holding means 15 is stored in the control information storage means 12, and the save data transfer classification holding means 45 is reset, the top priority proposed data transfer detecting means 34 outputs the data transfer classification (g) and middle priority which is the data transfer priority thereof as the data transfer to be executed next with top priority, whereby the resumption of the interrupted data transfer is executed prior to the other data transfer with equal or lower priority.

Further, a change in the data transfer priority information which is set in the priority information registering means 31 becomes possible in accordance with the request from the data transfer request source 17, thereby flexibly executing order control of the data transfer.

Next, the operation of the control means 11 will be described. A classification of the data transfer to be executed next and the priority thereof are held by the reservation data transfer classification holding means 41 and the data transfer priority holding means 42. Further, when the reservation end flag 47 is not set, the control information is not obtained by the reservation control information holding means 14 yet. Therefore, the reservation save control means 50 controls the control information transfer means 16 so as to obtain the control information corresponding to a classification of the data transfer held by the reservation data transfer classification holding means 41 from the control information storage means 12 and hold the same in the reservation control information holding means 14. Further, when completing the obtainment of all the control information, the reservation end flag 47 is set.

In addition, the classification and the priority of the data transfer corresponding to the control information stored in the control information storage means 12 are held by the save data transfer classification holding means 45 and the save data transfer priority holding means 46. Further, when the save end flag is not set, the control information is not stored in the control information storage means 12. Therefore, the reservation save control means 50 controls the control information transfer means 16 so as to store the control information held by the save data transfer classification holding means 15 in the region of the control information storage means 12 corresponding to the classification of the data transfer held by the save data transfer classification holding means 45. Further, when the storage of all the control information is completed, the save end flag 48 is set.

Further, when the data transfer request adjusting means 40 selects the classification and the priority of the data transfer to be executed next, in the case where the priority of the selected data transfer is higher than the priority held by the reservation data transfer priority holding means 42, the reservation save control means 50 resets the reservation end flag 47 and further controls the reservation data transfer classification holding means 41 and the reservation data transfer priority holding means 42 so as to hold the classification and the priority of the data transfer which is selected by the data transfer request adjusting means 40 and preferentially execute the obtainment of the high priority data transfer.

Further, when the priority held by the reservation data transfer priority holding means 42 is higher than the priority held by the execution data transfer priority holding means 44, and further the reservation end flag 47 is set, the reservation save control means 50 requests the data transfer execution means 13 the interruption of the data transfer.

Further, when the data transfer in the data transfer executing means 13 is interrupted, or the data transfer is completed but there is control information which is saved to the save control information holding means 15, and further the save end flag 48 is set, the reservation save control means 50 controls the save control information holding means 15 so as to hold the control information, further controls the save data transfer classification holding means 45 so as to hold the information held by the execution data transfer classification holding means 43, and controls the save data transfer priority holding means 46 so as to hold the information held by the execution data transfer priority holding means 44. Further, when the reservation end flag is set, the control information required for the next data transfer execution is already prepared in the reservation control information holding means 14. Therefore, the control information held by the reservation control information holding means 14 is transferred to the data transfer executing means 13, and the data transfer which is based on the control information is started. Further, simultaneously, the information held by the reservation data transfer classification holding means 41 is held by the execution data transfer classification holding means 43, the information held by the reservation data transfer priority holding means 42 is held by the execution data transfer priority holding means 44, the reservation end flag 47 is reset, and then the reservation data transfer classification holding means 41 and the reservation data transfer priority holding means 42 are reset.

Further, when the reservation end flag 47 is not set, the control information required for the next data transfer execution is not prepared in the reservation control information holding means 14 yet. Therefore, the execution data transfer classification holding means 43 and the execution data transfer priority holding means 44 are reset.

Further, when the data transfer in the data transfer execution means 13 is completed, and the control information is saved to the save control information holding means 15, the storage of the control information in the control information storage means 12 is completed, and then the information registered by the priority information registering means 31 and the data transfer request order registering means 33 which correspond to the data transfer classification of the save data transfer classification holding means 45 is cancelled. In addition, when the data transfer in the data transfer executing means 13 is completed, and the control information is not saved to the save control information holding means 15, the data transfer in the data transfer executing means 13 is completed, and then the information registered by the priority information registering means 31 and the data transfer request order registering means 33 which correspond to the data transfer classification of the execution data transfer classification holding means 43 is cancelled. Thereby, the control concerning the data transfer classification in the data transfer control apparatus is completed, and the data transfer request source can newly request the data transfer of this data transfer classification.

In this way, according to this embodiment, there are provided the reservation control information holding means 14 for temporarily holding the control information required for the data transfer to be executed next, and the save control information holding means 15 for temporarily holding the control information from the data transfer executing means 13. When the priority of the data transfer request corresponding to the control information held by the reservation control information holding means 14 is higher than the priority of the data transfer which is executed by the data transfer executing means 13, the interruption of the data transfer which is executed by the data transfer executing means 13 is requested. When the data transfer execution in the data transfer executing means 13 is interrupted, the control information required for the data transfer resumption is saved to the save control information holding means 15, the control information held by the reservation control information holding means 14 is transferred to the data transfer executing means 13 so that the data transfer executing means 13 executes the high priority data transfer. Therefore, when there is the transfer request with higher priority than that of the data transfer which is being presently executed, the required data can be promptly provided.

Further, when the control information which is saved to the save control information holding means 15 is stored in the control information storage means 12, and this control information is selected by the data transfer request adjusting means 40 as the data transfer to be executed next, the control information required for the data transfer resumption is obtained from the control information storage means 12 by the reservation control information holding means 14 to be output to the data transfer executing means 13, and the transfer of the data, which is once interrupted, is restarted.

INDUSTRIAL AVAILABILITY

As described above, the image processing apparatus according to the present invention relates to the data transfer control method in which the direct memory access (DMA) is performed by sharing one memory, and the image processing apparatus which can apply this method, and is very useful as the one which realizes the efficient DMA by preventing specific DMA from being concentratively generated, and simultaneously suppressing the increase in the circuit scale.

What is claimed is:

1. An image processing apparatus comprising:
image input/output processing means for inputting/outputting an image;
a memory which shares different types of image data by time division;
encoding/decoding processing means for encoding or decoding data stored in the memory; and
data transfer control means for controlling a data transfer from the memory to the image input/output processing means or the encoding/decoding processing means, wherein
a first transfer data group, which can be scheduled for direct memory access, is divided into burst transfer units,
the direct memory access of the burst transfer units is periodically performed, and
a second transfer data group, which cannot be scheduled for direct memory access is subjected to the direct memory access during at least a portion of the period that the first transfer data group is not subjected to the direct memory access; wherein
an in-progress direct memory access of the second transfer data group is suspended during a scheduled direct memory access of the first transfer data group.

2. The image processing apparatus of claim 1 wherein each burst transfer unit is obtained by equally dividing the first transfer group, and
each burst transfer unit is periodically subjected to the direct memory access.

3. An image processing apparatus comprising:
image input/output processing means for inputting/outputting an image;
a memory which shares different types of image data by a time division method; and
data transfer control means for controlling a data transfer from the memory to the image input/output processing means or encoding/decoding processing means, wherein the data transfer control means comprises:
the encoding/decoding processing means encodes or decodes data stored in the memory;
direct memory access request generating means for generating a transfer timing of data which can be previously subjected to the direct memory access scheduling;
direct memory access request adjusting means for performing adjustment so as to interrupt the direct memory access with the encoding/decoding processing means and preferentially execute the direct memory access of the image input/output processing means in the case where the direct memory access request is made from the direct memory access request generating means;
direct memory access settings holding means for holding setting information of the direct memory access;
data transfer executing means for generating an address of the memory on the basis of direct memory access setting information to transfer data by an instruction from the direct memory access request adjusting means; and memory control means for controlling writing or read-out of the memory.

4. The image processing apparatus of claim 3 wherein the direct memory access request generating means comprises:
frame detecting means for detecting the head of the frame;
first line detecting means for detecting the head of the line inside the frame;
clock counting means for receiving a line head signal from the first line detecting means to reset a discrete value, and thereafter counting an operation clock;
line counting means for receiving a frame head signal from the frame detecting means to reset a discrete value, and thereafter counting a line head signal from the first line detecting means;
second line detecting means for detecting a start time of the direct memory access in burst transfer units which can be previously subjected to the direct memory access scheduling from the discrete value of the clock counting means;
line cycle counting means for resetting the discrete value by the frame head signal from the frame detection means and a signal after one cycle end and counting the line detecting signal from the second line detecting means;
efficient vertical period detecting means for detecting an efficient line period from the discrete value of the line counting means and a detecting signal of the second line detecting signal;
efficient line detecting means for detecting an efficient line from the discrete value of the line cycle counting means; and
request signal detecting means for detecting a request timing of the direct memory access from the discrete value of the clock counting means, and
generates a direct memory access request signal from a signal output of the efficient vertical period detecting means, a signal output of the efficient line detecting means, and a signal output of the request signal detecting means.

5. The image processing apparatus of claim 3 wherein the direct memory access settings holding means comprises:
first control information storage means for storing control information required for data transfer control performed by the data transfer control means;
second control information storage means for holding control information required for the data transfer control concerning the direct memory access to be preferentially executed;
third control information storage means for, when the data transfer by the data transfer executing means is interrupted, saving the control information required for retransferring the data later to store; and
control information transfer means for performing a transfer of the control information among the first through third control information storage means, and a transfer of the control information between the data transfer executing means, and the second control information storage means and the third control information storage means.

6. The image processing apparatus of claim 3 wherein the direct memory access adjusting unit comprises:
data transfer request adjusting means for receiving a data transfer request from the encoding/decoding means or the direct memory access request generating means and selecting a classification of the data transfer to be executed next and a priority of the data transfer;
second data transfer classification holding means for holding a classification of the data transfer corresponding to the control information held by the second control information storage means;
second data transfer priority holding means for holding priority information corresponding to the control information held by the second control information storage means;
first data transfer classification holding means for holding a classification of the data transfer under the execution in the data transfer execution means;
first data transfer priority holding means for holding priority information of the data transfer which is being executed in the data transfer executing means;
third data transfer classification holding means for holding a classification of the data transfer corresponding to the control information held by the third control information storage means;
third data transfer priority holding means for holding priority information of the data transfer corresponding to the control information held by the third control information storage means; and
control information save means for executing data transfer control by using information of a reservation end flag which shows completing an obtainment of the control information by either of the data transfer request adjusting means, the first through third data transfer classification holding means, the first through third data transfer priority holding means, and the second control information holding means, and information of a save end flag which shows completing the storage of the control information held by the third control information storage means in the first control information storage means.

7. The image processing apparatus of claim 6 wherein
the data transfer request adjusting means selects a data transfer request which has the highest data transfer priority as well as is received earliest among the ones from which classifications of the data transfer held by the first through third data transfer classification holding means are excluded of the received data transfer requests, as the data transfer to be executed next.

8. The image processing apparatus of claim 7 wherein the data transfer request adjusting means comprises:
  priority information registering means for registering priority information of the received data transfer request;
  new data transfer request detecting means for detecting classifications of the data transfer request newly registered in the priority information registering means;
  data transfer request order registering means for registering classifications of the data transfer request detected by the new data transfer request detecting means in order; and
  top priority proposed data transfer detecting means for detecting a classification of the data transfer request which has the highest data transfer priority as well as is received earliest among the ones from which classifications of the data transfer held by the first through third data transfer classification holding means are excluded, from information registered by the priority information registering means and the data transfer request order registering means, and information held by the first through third data transfer classification holding means.

9. The image processing apparatus of claim 8 wherein the data transfer request adjusting means changes priority information registered by the priority information registration means in accordance with the result detected by the top priority proposed data transfer detecting means.

10. The image processing apparatus of claim 1, wherein a suspended direct memory access of the second transfer data group resumes after the scheduled direct memory access of the first transfer data group.

11. An image processing apparatus, comprising:
  an image processor configured to input and output an image;
  a memory; and
  data transfer controller configured to control data transfer from said memory to said image processor or an encoder/decoder, said data transfer controller comprising:
    a direct memory access request generator configured to schedule direct memory access;
    a direct memory access interrupter configured to interrupt direct memory access with said encoder/decoder and to execute scheduled direct memory access of said image input processor if direct memory access is request by said direct memory access request generator;
    a store configured to hold setting information of direct memory access;
    a data transfer executor configured to generate an address of said memory based on at least direct memory access setting information to transfer data by an instruction from the direct memory access request adjustor; and
    a memory controller configured to control writing or read-out of the memory.

* * * * *